United States Patent
Hashimoto et al.

(10) Patent No.: US 12,099,031 B2
(45) Date of Patent: Sep. 24, 2024

(54) ELECTROPHORESIS METHOD, ELECTROPHORESIS SYSTEM, AND CONTAINER VESSEL FOR ELECTROPHORESIS

(71) Applicant: HAMAMATSU PHOTONICS K.K., Hamamatsu (JP)

(72) Inventors: Yu Hashimoto, Hamamatsu (JP); Sayaka Kazami, Hamamatsu (JP)

(73) Assignee: HAMAMATSU PHOTONICS K.K, Hamamatsu (JP)

( * ) Notice: Subject to any disclaimer, the term of this patent is extended or adjusted under 35 U.S.C. 154(b) by 316 days.

(21) Appl. No.: 17/259,016

(22) PCT Filed: Jun. 19, 2019

(86) PCT No.: PCT/JP2019/024362
§ 371 (c)(1),
(2) Date: Jan. 8, 2021

(87) PCT Pub. No.: WO2020/012904
PCT Pub. Date: Jan. 16, 2020

(65) Prior Publication Data
US 2021/0302368 A1 Sep. 30, 2021

(30) Foreign Application Priority Data
Jul. 13, 2018 (JP) .................................. 2018-133296

(51) Int. Cl.
*G01N 27/453* (2006.01)
*G01N 27/447* (2006.01)

(52) U.S. Cl.
CPC ..... *G01N 27/44704* (2013.01); *G01N 27/453* (2013.01)

(58) Field of Classification Search
CPC ....................... G01N 27/44704; G01N 27/453
See application file for complete search history.

(56) References Cited

U.S. PATENT DOCUMENTS 3,674,678 A * 7/1972 Post, Jr. ........... G01N 27/44756
204/616
4,246,222 A * 1/1981 Monthony .............. B29C 70/78
204/620

(Continued)

FOREIGN PATENT DOCUMENTS

| CN | 102016560 A1 | 4/2011 |
| CN | 102128873 A1 | 7/2011 |

(Continued)

OTHER PUBLICATIONS

International Preliminary Report on Patentability mailed Jan. 28, 2021 for PCT/JP2019/024362.

*Primary Examiner* — Alexander S Noguerola
(74) *Attorney, Agent, or Firm* — Faegre Drinker Biddle & Reath LLP

(57) ABSTRACT

A support body includes a concentrating portion, which concentrates an object, between a first end portion and a second end portion. When an area of a cut section of a flow path when cut at a predetermined position in a first direction along a plane orthogonal to the first direction is a flow path cross-sectional area, a flow path cross-sectional area of the concentrating portion is smaller than a flow path cross-sectional area in a first region closer to a first end portion side than the concentrating portion, and a flow path cross-sectional area of a second region closer to the second end portion side than the concentrating portion is larger than the flow path cross-sectional area of the concentrating portion.

14 Claims, 15 Drawing Sheets

(56) References Cited

U.S. PATENT DOCUMENTS

| | | | | |
|---|---|---|---|---|
| 5,318,682 | A | * | 6/1994 | Singer .............. G01N 27/44743 |
| | | | | 204/620 |
| 5,439,573 | A | | 8/1995 | Luo |
| 5,449,446 | A | * | 9/1995 | Verma .............. G01N 27/44721 |
| | | | | 204/620 |
| 5,779,869 | A | * | 7/1998 | Helfer .............. G01N 27/44704 |
| | | | | 204/616 |
| 11,090,660 | B2 | * | 8/2021 | Hayes ................ G01N 15/1484 |
| 2001/0023825 | A1 | * | 9/2001 | Frumin ............ G01N 27/44773 |
| | | | | 204/600 |
| 2006/0263777 | A1 | | 11/2006 | Tong |
| 2011/0120867 | A1 | | 5/2011 | Mishina et al. |
| 2014/0131204 | A1 | * | 5/2014 | Chou ..................... B03C 5/026 |
| | | | | 204/601 |

FOREIGN PATENT DOCUMENTS

| | | |
|---|---|---|
| EP | 1211510 A1 | 6/2002 |
| JP | S62-239047 A | 10/1987 |
| JP | S63-210653 A | 9/1988 |
| JP | 2003-114216 A | 4/2003 |
| JP | 2005-278418 A | 10/2005 |
| JP | 2010-210264 A | 9/2010 |
| JP | 2011-039037 A | 2/2011 |
| TW | I510773 B | 12/2015 |
| WO | WO 02/044706 A1 | 6/2002 |

\* cited by examiner

*Fig.3*
(a)
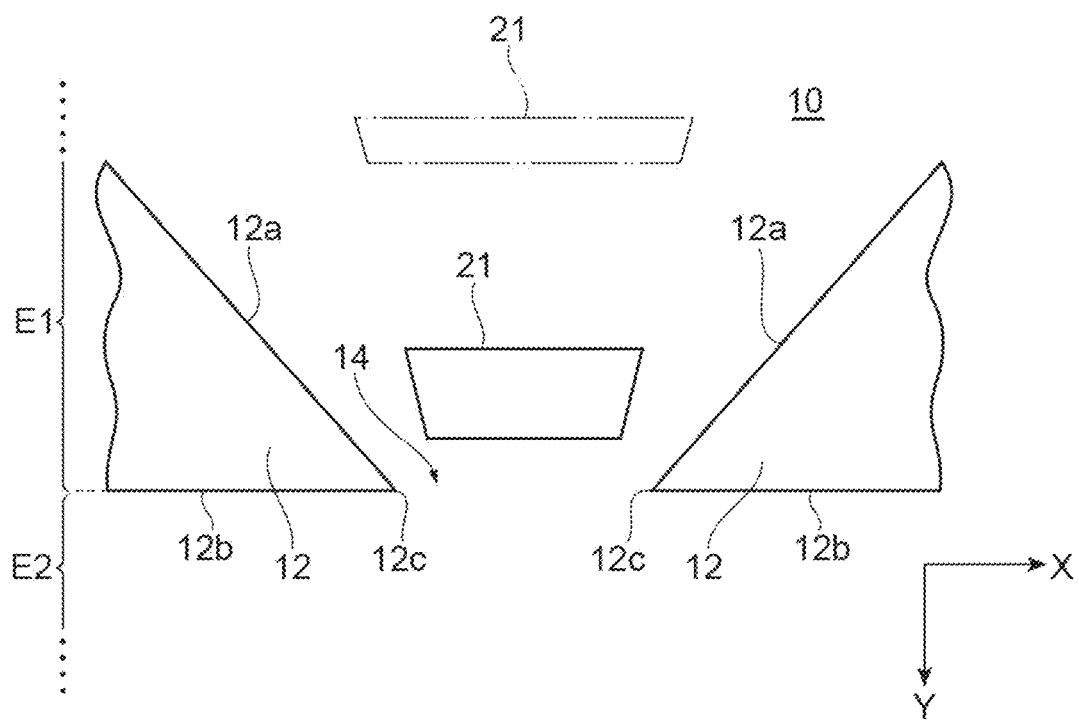
(b)
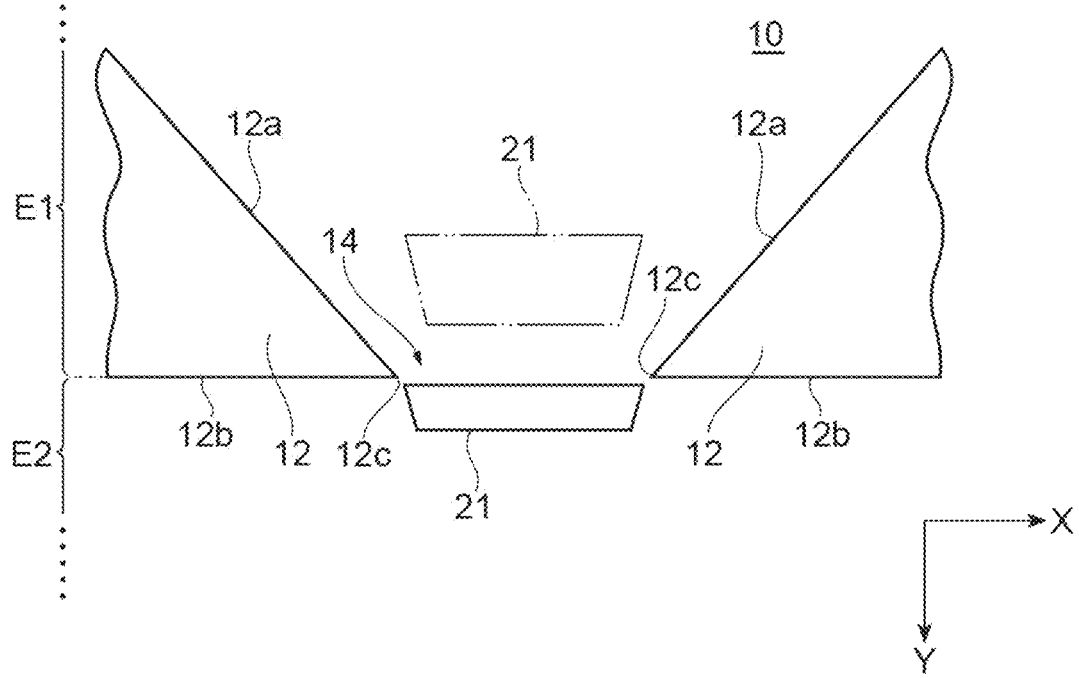

*Fig.9*
(a)
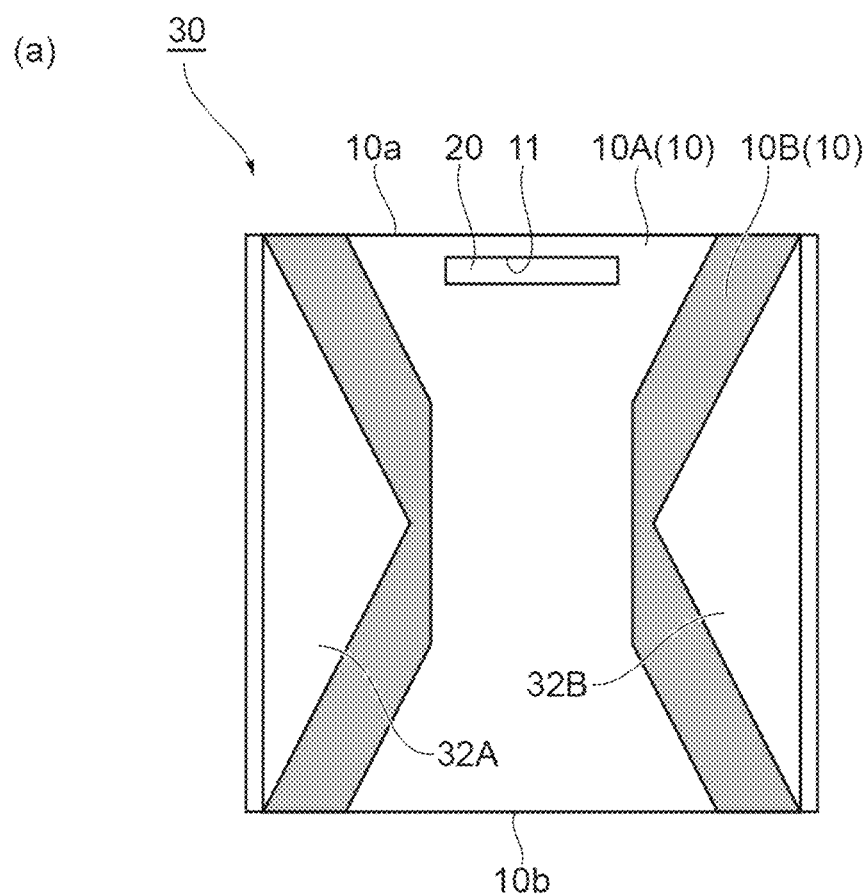
(b)
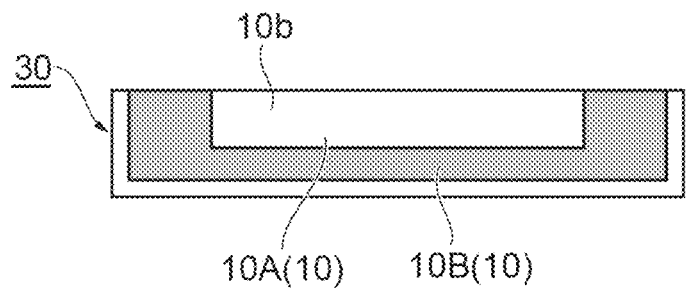

Fig.12
(a)
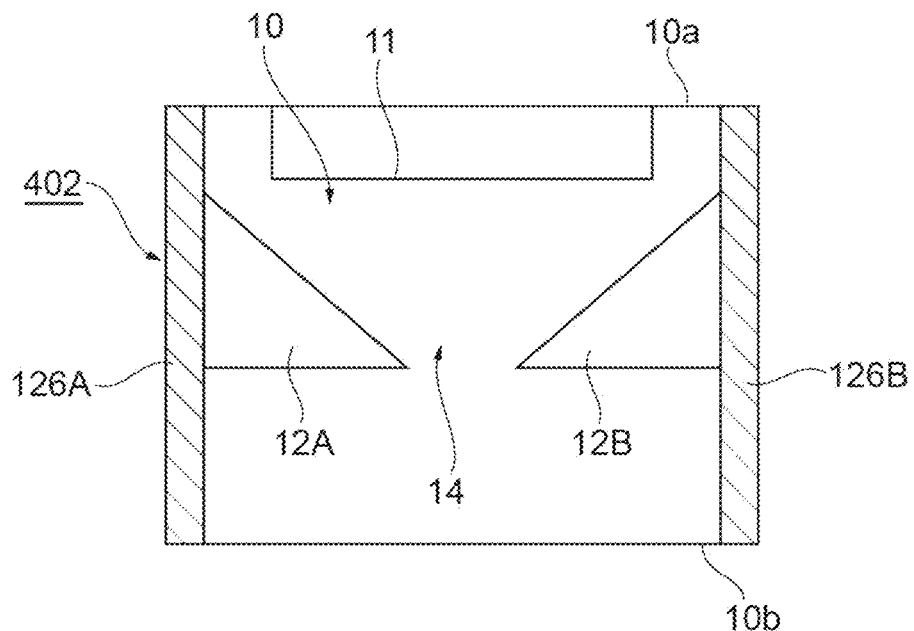
(b)
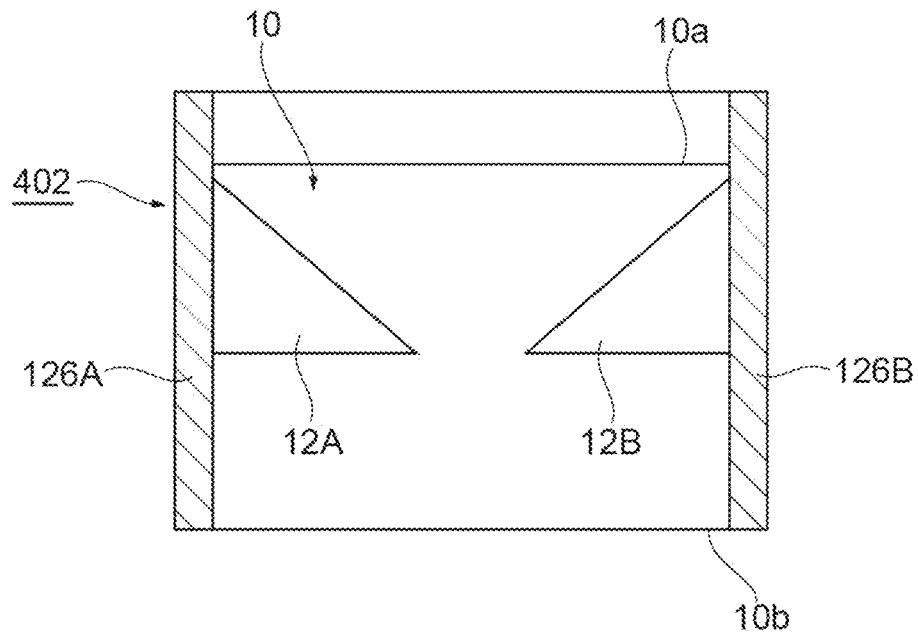

Fig. 13
(a)
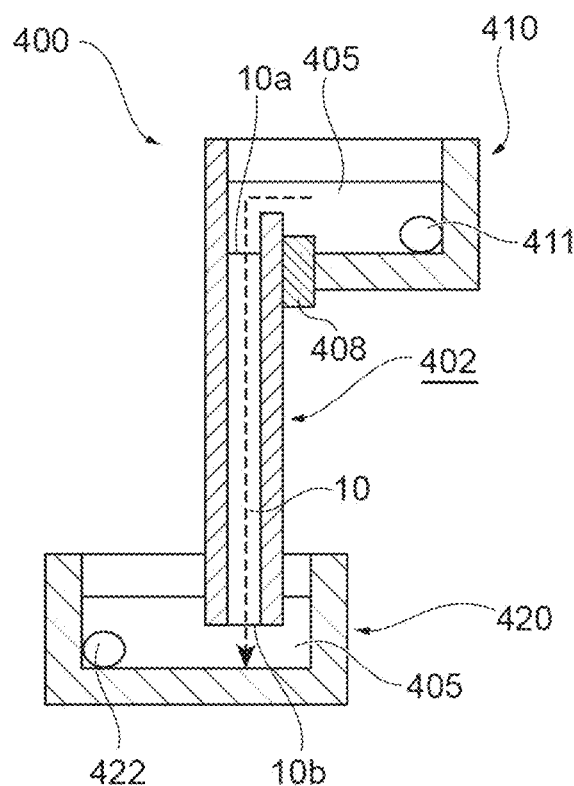
(b)
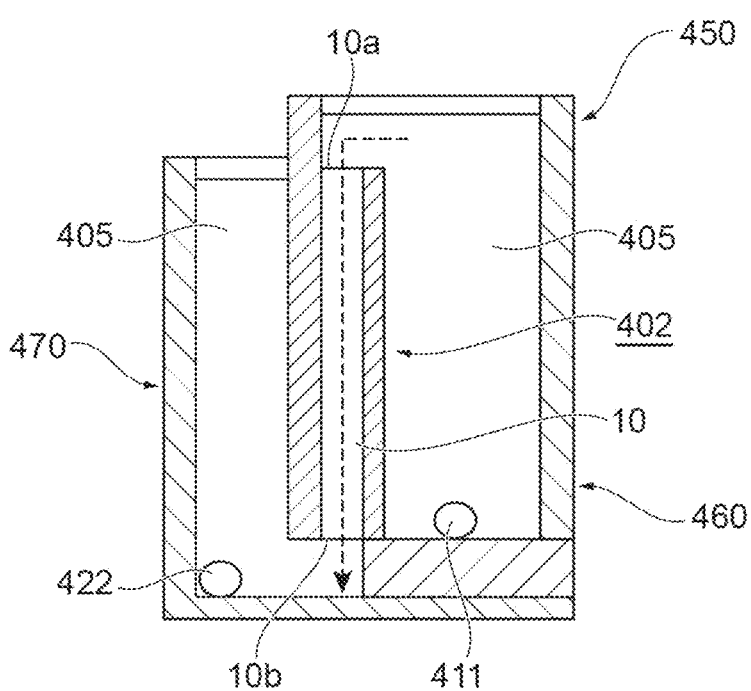

ELECTROPHORESIS METHOD, ELECTROPHORESIS SYSTEM, AND CONTAINER VESSEL FOR ELECTROPHORESIS

TECHNICAL FIELD

The present disclosure relates to an electrophoresis method, an electrophoresis system, and an accommodating container for electrophoresis.

BACKGROUND ART

As an electrophoresis method in the related art, there is known a method for causing a sample containing an object to move inside a support body to separate other substances and the object from each other. As such an electrophoresis method, for example, Patent Literature 1 describes a method by which a sample is loaded on one end portion side of a support body having a rectangular shape, and voltage is applied to cause the object to move inside the support body. Accordingly, the object and the other substances are separated from each other by a difference in movement speed between the object and the other substances such as impurities inside the support body.

CITATION LIST

Patent Literature

Patent Literature 1: Japanese Unexamined Patent Publication No. 2003-114216

SUMMARY OF INVENTION

Technical Problem

As described above, the electrophoresis method in the related art can separate the object and the other substances from each other. However, when the separated object is to be concentrated, the electrophoresis method in the related art requires a step of concentrating the object as a separate step from electrophoresis. Therefore, in addition to executing electrophoresis to separate the object from the other substances, it is also required to concentrate the object.

Therefore, an object of the present disclosure is to provide an electrophoresis method, an electrophoresis system, and an accommodating container for electrophoresis capable of also concentrating an object in addition to separating the object from other substances.

Solution to Problem

According to one aspect of the present disclosure, there is provided an electrophoresis method for causing a sample containing an object to move inside a support body to separate other substances and the object from each other, the method including: a support body preparation step of preparing the support body that includes a first end portion on one side in a first direction and a second end portion on the other side, and forms a flow path of the sample between the first end portion and the second end portion; a sample loading step of loading the sample with respect to the support body; and a voltage application step of applying voltage to form a potential difference in the flow path and thus to cause the object to move in the flow path to a second end portion side of the first direction. The support body includes a concentrating portion, which concentrates the object, between the first end portion and the second end portion. When an area of a cut section of the flow path when cut at a predetermined position in the first direction along a plane orthogonal to the first direction is a flow path cross-sectional area, a flow path cross-sectional area of the concentrating portion is smaller than a flow path cross-sectional area in a first region closer to a first end portion side than the concentrating portion, and a flow path cross-sectional area of a second region closer to the second end portion side than the concentrating portion is larger than the flow path cross-sectional area of the concentrating portion.

In the electrophoresis method according to one aspect of the present disclosure, the support body includes the concentrating portion, which concentrates the object, between the first end portion and the second end portion. The flow path cross-sectional area of the concentrating portion is smaller than the flow path cross-sectional area in the first region closer to the first end portion side than the concentrating portion. When the object moves in the flow path in the voltage application step, the object is separated from the other substances in the first region, and then passes through the concentrating portion. At this time, since the object passes through the concentrating portion having a small flow path cross-sectional area, the object is concentrated in the direction orthogonal to the first direction. In addition, the flow path cross-sectional area of the second region closer to the second end portion side than the concentrating portion is larger than the flow path cross-sectional area of the concentrating portion. Since the voltage of the flow path decreases at a location where the flow path cross-sectional area is increased, the movement speed of the object decreases. Therefore, after the object has passed through the concentrating portion, the movement speed of the object decreases in the vicinity of the boundary portion between the concentrating portion and the second region. Accordingly, after the object has passed through the concentrating portion, the object is concentrated in the first direction. As described above, the electrophoresis method can also concentrate the object in addition to separating the object from the other substances.

According to one aspect of the present disclosure, there is provided an electrophoresis system that causes a sample containing an object to move inside a support body to separate other substances and the object from each other, the system including: the support body that includes a first end portion on one side in a first direction and a second end portion on the other side, and forms a flow path of the sample between the first end portion and the second end portion; and a voltage application unit that applies voltage to form a potential difference in the flow path and thus to cause the object of the sample, which is loaded on a first end portion side, to move in the flow path to a second end portion side of the first direction. The support body includes a concentrating portion, which concentrates the object, between the first end portion and the second end portion. When an area of a cut section of the flow path when cut at a predetermined position in the first direction along a plane orthogonal to the first direction is a flow path cross-sectional area, a flow path cross-sectional area of the concentrating portion is smaller than a flow path cross-sectional area in a first region closer to the first end portion side than the concentrating portion, and a flow path cross-sectional area of a second region closer to the second end portion side than the concentrating portion is larger than the flow path cross-sectional area of the concentrating portion.

In the electrophoresis system according to one aspect of the present disclosure, the same effects as in the above-described electrophoresis method can be obtained.

According to one aspect of the present disclosure, there is provided an accommodating container for electrophoresis that accommodates a support body in an electrophoresis method for causing a sample containing an object to move inside the support body to separate other substances and the object from each other, the container including: a defining surface that defines a flow path cross-sectional area of a flow path of the sample, the flow path extending in a first direction inside the support body. The flow path cross-sectional area is an area of a cut section of the flow path when cut at a predetermined position in the first direction along a plane orthogonal to the first direction. The defining surface extends along the first direction, has a first end portion on one side in the first direction and a second end portion on the other side, and has a concentrating portion forming portion, which forms a concentrating portion that concentrates the object, between the first end portion and the second end portion. A flow path cross-sectional area defined by the concentrating portion forming portion is smaller than a flow path cross-sectional area defined by a first portion closer to a first end portion side than the concentrating portion forming portion. A flow path cross-sectional area defined by a second portion closer to a second end portion side than the concentrating portion forming portion is larger than the flow path cross-sectional area defined by the concentrating portion forming portion.

In the accommodating container for electrophoresis according to one aspect of the present disclosure, the concentrating portion forming portion, the first portion, and the second portion of the defining surface can form the concentrating portion, the first region, and the second region of the support body in the electrophoresis method and the electrophoresis system described above. Therefore, when the support body accommodated in the accommodating container for electrophoresis according to one aspect of the present disclosure is used, the same effects as in the electrophoresis method and the electrophoresis system described above can be obtained.

In the electrophoresis method and the electrophoresis system according to one aspect of the present disclosure, an insulator may define the flow path cross-sectional area to form the concentrating portion. In addition, in the accommodating container for electrophoresis according to one aspect of the present disclosure, the concentrating portion forming portion may be formed by an insulator. In this case, the insulator can define the flow path cross-sectional area to a desired size in a state where the insulator prevents electricity from leaking to portions other than the flow path in the concentrating portion.

In the electrophoresis method and the electrophoresis system according to one aspect of the present disclosure, the flow path may be widened in a boundary portion between the concentrating portion and the second region in a direction intersecting the first direction. In addition, in the accommodating container for electrophoresis according to one aspect of the present disclosure, the defining surface may be widened in a boundary portion between the concentrating portion forming portion and the second portion in a direction intersecting the first direction. In this case, since the flow path cross-sectional area can be widened in the vicinity of the boundary portion between the concentrating portion and the second region, the voltage of the flow path can be decreased. Therefore, after the object has passed through the concentrating portion, the movement speed of the object decreases in the vicinity of the boundary portion between the concentrating portion and the second region. Accordingly, after the object has passed through the concentrating portion, the object is concentrated in the first direction.

In the electrophoresis method and the electrophoresis system according to one aspect of the present disclosure, the flow path cross-sectional area of the first region may be decreased as the first region approaches the concentrating portion from the first end portion side. In addition, in the accommodating container for electrophoresis according to one aspect of the present disclosure, the flow path cross-sectional area defined by the first portion may be narrowed as the first portion approaches the concentrating portion forming portion from the first end portion side. In this case, the voltage of the flow path in the first region increases gradually as the flow path approaches the concentrating portion. Therefore, the movement speed of the object increases gradually, and thus the resolution of separation of the object is improved.

In the electrophoresis method according to one aspect of the present disclosure, in the sample loading step, the sample may be loaded in a sample loading portion that extends to the second end portion side as the sample loading portion extends away from a center position in a second direction orthogonal to the first direction. In the electrophoresis system according to one aspect of the present disclosure, the support body may include a sample loading portion in which the sample is loaded, and the sample loading portion may extend to the second end portion side as the sample loading portion extends away from a center position in a second direction orthogonal to the first direction. For example, when the concentrating portion is formed at the center position, a difference between a distance from the sample, which is loaded in the vicinity of the center position of the sample loading portion, to the concentrating portion and a distance from the sample, which is loaded at a position away from the center position, to the concentrating portion can be decreased. Accordingly, the timing that the object in the sample loading portion reaches the concentrating portion can be made uniform.

Advantageous Effects of Invention

According to one aspect of the present disclosure, it is also possible to concentrate the object in addition to separating the object from the other substances.

BRIEF DESCRIPTION OF DRAWINGS

FIGS. 3(a) and 3(b) are schematic views illustrating a state of a band of an object in the vicinity of a concentrating portion.

FIGS. 9(a) and 9(b) are plan views illustrating accommodating containers according to modification examples.

FIGS. 12(a) and 12(b) are views for describing electrophoresis according to modification examples.

FIGS. 13(a) and 13(b) are views for describing electrophoresis according to modification examples.

DESCRIPTION OF EMBODIMENTS

Figure 1:
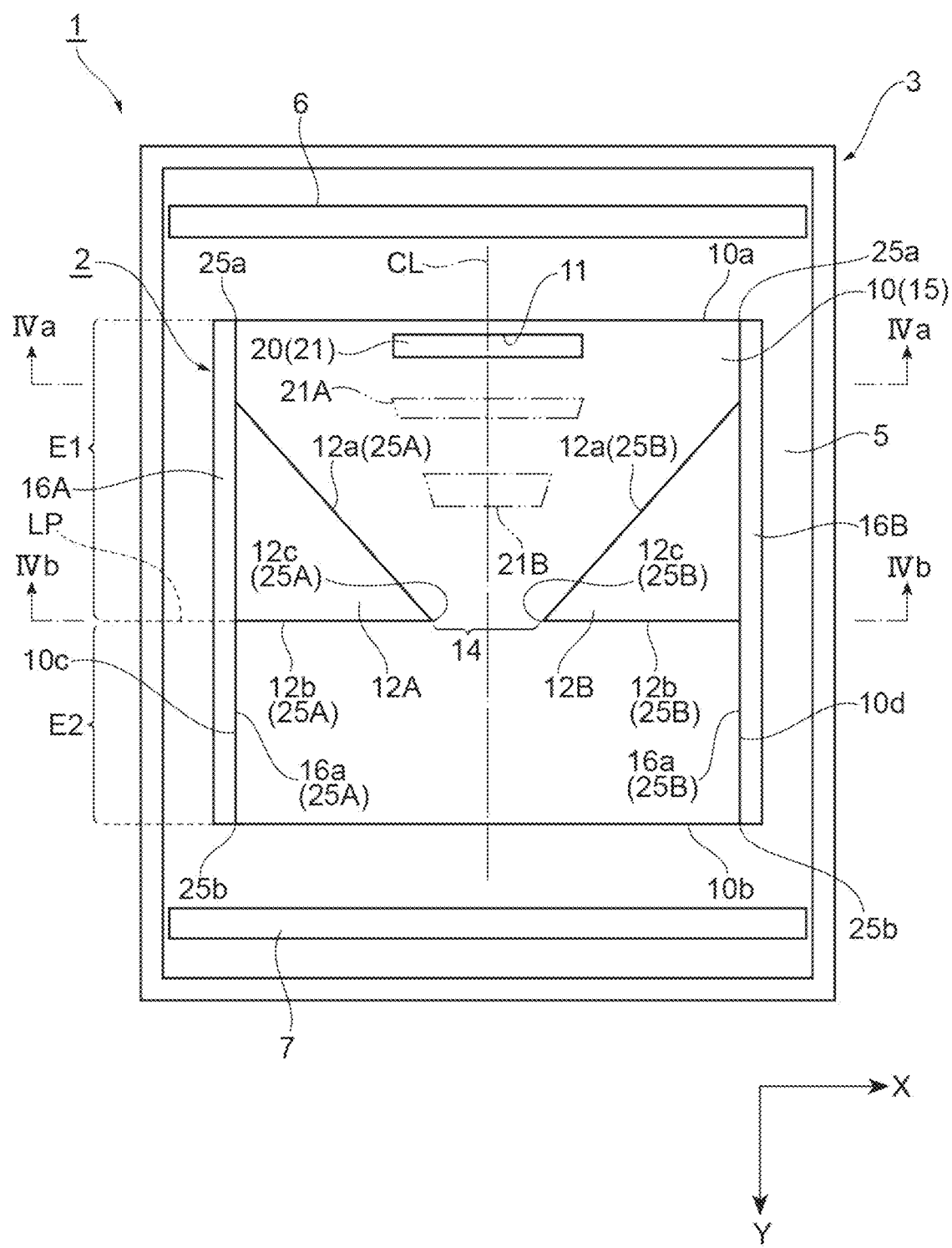
FIG. 1 is a plan view illustrating an electrophoresis system according to the present embodiment.

Hereinafter, an exemplary embodiment of the present invention will be described in detail with reference to the drawings. Furthermore, in the drawings, the same or corresponding portions are denoted by the same reference signs, and duplicated descriptions will be omitted.

First Embodiment

FIG. 1 is a plan view illustrating an electrophoresis system 1 according to the present embodiment. The electrophoresis system 1 according to the present embodiment is a system that can separate an object 21, which is contained in a sample 20, from other substances to concentrate the object 21 which is separated. As illustrated in FIG. 1, the electrophoresis system 1 includes an accommodating container 2, an electrophoresis tank 3, electrodes (voltage application unit) 6 and 7, and a support body 10.

The accommodating container 2 is a container that accommodates the support body 10. The accommodating container 2 includes side wall portions 16A and 16B facing each other. The side wall portions 16A and 16B face each other so as to be parallel to each other in a state of separation. An internal space interposed between the side wall portions 16A and 16B is used as a space that accommodates the support body 10. Furthermore, one end side (back side of the sheet of FIG. 1) of the internal space is sealed by a bottom wall portion, and the other end side (front side of the sheet of FIG. 1) is open. As the material of the side wall portions 16A and 16B and the bottom wall portion, plastic, glass, or the like may be adopted. In addition, a soft material such as silicone rubber may be adopted as the material. In this case, the accommodating container 2 is deformable, so that the impact when the support body 10 is taken out can be reduced.

Furthermore, in the following description, an "X-axis direction" and a "Y-axis direction" may be used as needed. The X-axis direction is a direction where the side wall portions 16A and 16B face each other, and has a side wall portion 16A side and a side wall portion 16B side as a "negative side" and a "positive side", respectively. The X-axis direction corresponds to a "second direction" in the claims. The Y-axis direction is an extending direction of the side wall portions 16A and 16B, and has one end side of the side wall portions 16A and 16B and the other end side of the side wall portions 16A and 16B as a "negative side" and a "positive side", respectively. The Y-axis direction corresponds to a "first direction" in the claims. Furthermore, both of the X-axis direction and the Y-axis direction are horizontal directions.

The accommodating container 2 further includes an insulator spacer (insulator) 12A provided on an inner surface 16a of the side wall portion 16A, and an insulator spacer (insulator) 12B provided on an inner surface 16a of the side wall portion 16B. Furthermore, the detailed shapes of the insulator spacers 12A and 12B will be described in detail together with a description of the support body 10. As long as the material of the insulator spacers 12A and 12B is an insulator or a substance having low electrical conductivity equivalent to that of the insulator, the material is not particularly limited. For example, examples of the material include plastic, polystyrene, silicone rubber, natural rubber, and the like, and a substance such as clay having shape plasticity may be used. Furthermore, the insulator spacers 12A and 12B are formed as separate members from the side wall portions 16A and 16B, but may be integrally formed with the side wall portions 16A and 16B.

The electrophoresis tank 3 is a tank that accommodates a phoresis buffer 5 for applying voltage to the support body 10. In the electrophoresis tank 3, the support body 10 accommodated in the accommodating container 2 is immersed in the phoresis buffer 5. As the solution of the phoresis buffer 5, a TBE buffer, a TAE buffer, or the like may be adopted.

The electrodes 6 and 7 are members that apply voltage to the support body 10 via the phoresis buffer 5. The electrode 6 is loaded closer to the negative side of the Y-axis direction than the accommodating container 2 in the electrophoresis tank 3. The electrode 7 is loaded closer to the positive side of the Y-axis direction than the accommodating container 2 in the electrophoresis tank 3. The electrode 6 is a negative electrode, and the electrode 7 is a positive electrode. The electrodes 6 and 7 may apply a constant voltage to the support body 10; however, the applied voltage may not be constant.

The support body 10 includes an end portion 10a (first end portion) on the negative side of the Y-axis direction and an end portion 10b (second end portion) on the positive side, and a flow path 15 of the sample 20 is formed between the end portion 10a and the end portion 10b. The support body 10 includes a sample loading portion 11, in which the sample 20 is loaded, on an end portion 10a side. The sample loading portion 11 is formed of a groove portion that accommodates the sample 20 therein. The sample loading portion 11 is formed at a position, which is slightly apart from the end portion 10a to the positive side of the Y-axis direction, so as to extend along the end portion 10a in the X-axis direction. However, the sample loading portion 11 is not limited to having a configuration illustrated in FIG. 1, and may adopt various configurations (specific modification examples will be described later).

The support body 10 is a member that provides a difference in movement speed to a substance, which moves in the flow path 15, according to a characteristic. The support body 10 causes a substance contained in the sample 20 to move at a movement speed according to molecular weight. Alternatively, the support body 10 can cause a substance contained in the sample 20 to move at a movement speed according to structure. Furthermore, the support body 10 causes a substance contained in the sample 20 to move at a movement speed according to a state of modification (for example, methylation, gold nanoparticle modification, or the like) or a state of charge (polarity and magnitude of the charge of the object). Accordingly, the support body 10 can separate substances of different characteristics from each other. For example, as indicated by imaginary line in FIG. 1, since a substance 21A and a substance 21B of different characteristics have a difference in movement speed inside the support body 10, the substance 21A and the substance 21B are separated from each other inside the support body 10. When the electrodes 6 and 7 apply voltage to the support body 10, the end portion 10a and the end portion 10b have different potentials. Namely, a potential difference is formed inside the support body 10. The object 21 in the sample 20 is negatively charged, and the electrode 7 is a positive electrode. Therefore, the object 21 in the sample 20 loaded on the end portion 10a side moves in the flow path 15 from the end portion 10a side to an end portion 10b side. Namely, the object 21 moves from the negative side toward the positive side in the Y-axis direction. Accordingly, since the object 21 moves in the flow path 15 at a movement speed according to a characteristic, the object 21 is separated from other substances moving at different movement speeds from that of the object 21. Furthermore, in the Y-axis direction, the negative side, namely, the end portion 10a side corresponds to an upstream side in the flow path 15, and the positive side, namely, the end portion 10b side corresponds to a downstream side in the flow path 15.

Here, as an example of the object 21 to be acquired using the electrophoresis system 1 according to the present embodiment, a DNA structure called "DNA origami" can be provided. The "DNA origami" is the structure of DNA produced by heat treating DNA that is a biological substance. Since a DNA sequence program is assembled in advance, such a DNA structure is folded into a desired shape. When the DNA structure is produced, impurities such as an excessive amount of staple DNA and DNA structures (aggregate and the like) other than a target structure are mixed. Since the DNA structure of the object 21 has a specific structure, short chain DNA and the like contained in the impurities have different movement speeds inside the support body 10. Therefore, the electrophoresis system 1 according to the present embodiment can separate the DNA structure from the impurities in the sample 20, in which the DNA structure that is the object 21 and the impurities are mixed, to concentrate the DNA structure which is separated. Furthermore, as the object 21, straight chain or annular DNA may be adopted instead of the structure such as the above-mentioned DNA origami.

An agarose gel is used as the support body 10. The purity, gel strength, melting point, and gelation temperature of the agarose used are appropriately selected according to the purpose based on the range of separation of the object 21 and the like. In addition, the support body 10 may contain a TBE buffer or a TAE buffer. Since the TBE buffer has high ionic strength and buffering capacity, the TBE buffer is suitable for separation or long period of phoresis of DNA fragments of 1 kb or less. On the other hand, since the TAE buffer has low ionic strength and buffering capacity, the TAE buffer is suitable for separation or long period of phoresis of DNA fragments of 10 kb or more. In addition, the gel and the buffer of the support body 10 may contain an additive such as a magnesium ion compound (magnesium chloride, magnesium acetate, or the like) which is a divalent cation. Since the additive is contained in the support body 10, when the object 21 is a DNA structure, the structure of the DNA structure can be stably maintained.

The gel used in the support body 10 is a so-called "separation gel". Namely, the gel used in the support body 10 is distinguished from a gel called a "concentration gel". The "separation gel" is used for separation of an object. The "concentration gel" is used for concentration of an object. Particularly, in acrylamide gels, the "separation gel" and the "concentration gel" are distinguished by the pH difference from a phoresis buffer and the gel concentration, an acrylamide gel having low pH and gel concentration is the "concentration gel", and an acrylamide gel having high pH and gel concentration is the "separation gel".

Figure 4:
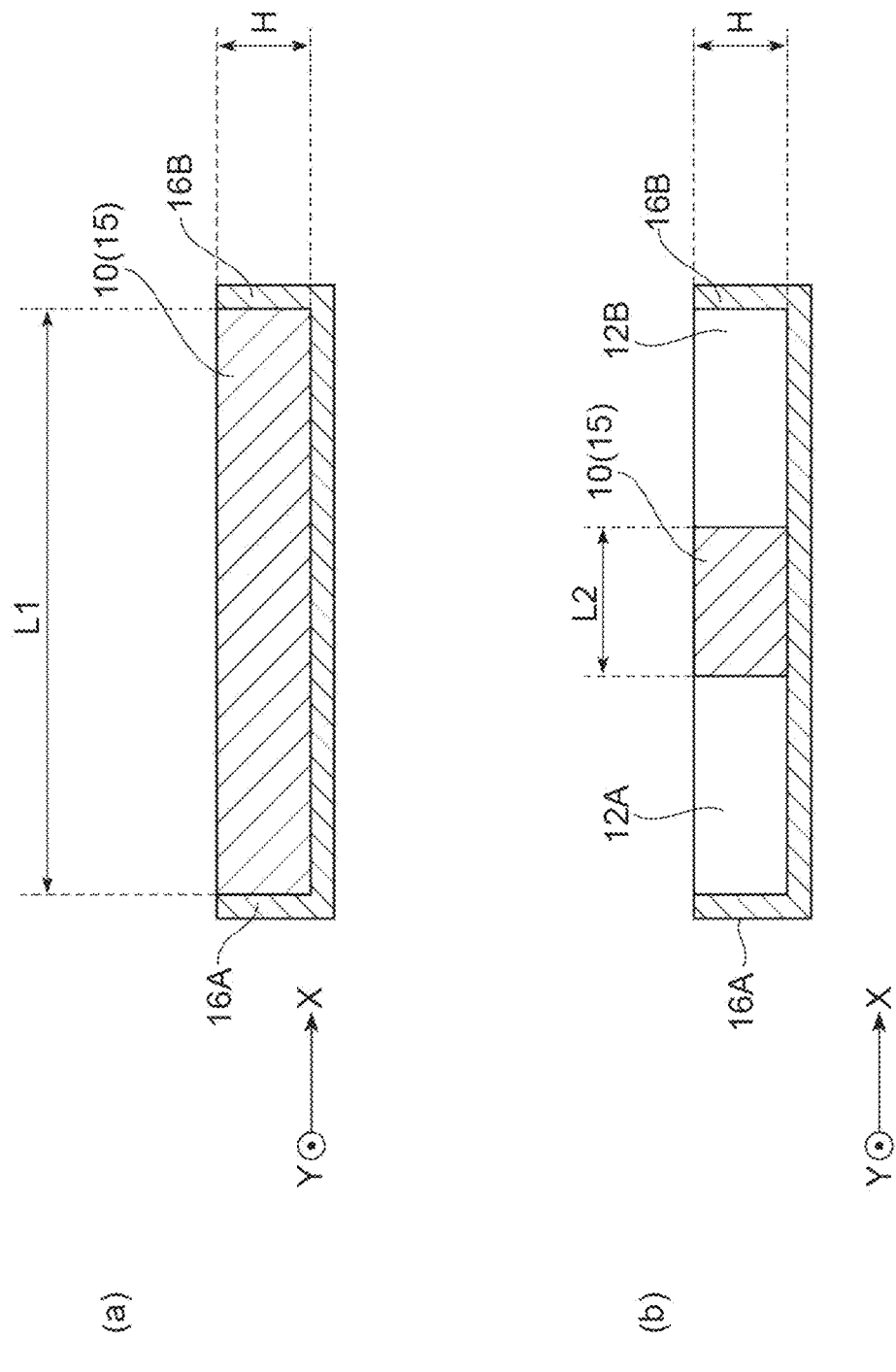
FIG. 4(a) is a cross-sectional view along line IVa-IVa illustrated in FIG. 1.
FIG. 4(b) is a cross-sectional view along line IVb-IVb illustrated in FIG. 1.

Next, the shape of the support body 10 will be described in detail. The support body 10 has a shape such that the flow path cross-sectional area of the flow path 15 is changed in an interval from the end portion 10a to the end portion 10b. In the present embodiment, end portions 10c and 10d of the support body 10 which face each other in the X-axis direction have a shape bent at a specific position in the Y-axis direction, instead of a shape extending straight in the Y. The support body 10 has a constant dimension in a thickness direction (direction orthogonal to the X-axis direction and the Y-axis direction). Furthermore, the flow path cross-sectional area corresponds to the area of a cut section of the support body 10 when cut along a plane orthogonal to the Y-axis direction. As one example, FIG. 4 illustrates a flow path cross section of the flow path 15. The flow path cross section illustrated in FIG. 4 has a dimension of L1 in the X-axis direction and a dimension of H in the thickness direction. Therefore, the flow path cross-sectional area of the flow path cross section is expressed by "L1×H". The flow path cross section of a concentrating portion 14 illustrated in FIG. 4(b) has a dimension of L2 in the X-axis direction and a dimension of H in the thickness direction. Therefore, the flow path cross-sectional area of the flow path cross section is expressed by "L2×H".

The shape of the end portions 10c and 10d of the support body 10 is a shape corresponding to the accommodating container 2. As described above, the insulator spacer 12A is provided on the inner surface 16a of the side wall portion 16A, and the insulator spacer 12B is provided on the inner surface 16a of the side wall portion 16B. The insulator spacer 12A and the insulator spacer 12B have a structure that is line symmetrical with respect to a central axis CL set at the center position in the X-axis direction of the accommodating container 2. The insulator spacers 12A and 12B are right triangular members loaded at a position that is apart from the end portions 10a and 10b in the Y-axis direction. The insulator spacers 12A and 12B have inclined surfaces 12a and 12a that are inclined with respect to the inner surfaces 16a and 16a of the side wall portions 16A and 16B, and perpendicular surfaces 12b and 12b that are perpendicular to the inner surfaces 16a and 16a.

The inclined surfaces 12a and 12a are linearly inclined to approach the central axis CL as the inclined surfaces 12a and 12a extend from the inner surfaces 16a and 16a toward the positive side of the Y-axis direction. End portions on the negative side of the Y-axis direction of the inclined surfaces 12a and 12a are in contact with the inner surfaces 16a and 16a at a position that is apart from the end portion 10a to the positive side of the Y-axis direction. The insulator spacers 12A and 12B include tops 12c and 12c in portions that are closest to the central axis CL and are end portions on the positive side of the Y-axis direction of the inclined surfaces 12a and 12a. The tops 12c and 12c are loaded at positions that are apart from each other to interpose the central axis CL therebetween. Namely, a gap is formed between the insulator spacer 12A and the insulator spacer 12B. The perpendicular surfaces 12b and 12b extend straight from the inner surfaces 16a and 16a toward the tops 12c and 12c. The perpendicular surfaces 12b and 12b are loaded at a position that is apart from the end portion 10b to the negative side of the Y-axis direction.

Since the insulator spacers 12A and 12B described above are provided, the support body 10 includes the concentrating portion 14, which concentrates the object 21, between the end portion 10a and the end portion 10b. The insulator spacers 12A and 12B define the flow path cross-sectional area to form the concentrating portion 14. Regarding the concentrating portion 14, the object 21 is concentrated in the concentrating portion 14 and the object 21 is induced to be concentrated in the vicinity of the concentrating portion 14. The concentrating portion 14 is a region where the flow path cross section is smallest in a region where the flow path cross section is partially decreased in the Y-axis direction. In the present embodiment, since the flow path width (size in the X-axis direction) of the flow path 15 is smallest at the position of the tops 12c and 12c, the flow path cross-sectional area is smallest. Therefore, the concentrating portion 14 is formed in a portion interposed between the tops 12c and 12c of the insulator spacers 12A and 12B. Furthermore, the size of the flow path cross-sectional area of the concentrating portion 14 is not particularly limited, and may be set in the range of 60% or less of the flow path cross-sectional area of the end portions 10a and 10b.

In the flow path 15 of the support body 10, a region closer to the negative side than the concentrating portion 14 in the Y-axis direction, namely, an end portion 10a side region is referred to as a region (first region) E1. In the flow path 15 of the support body 10, a region closer to the positive side than the concentrating portion 14 in the Y-axis direction, namely, an end portion 10b side region is referred to as a region (second region) E2. The flow path width of the concentrating portion 14 is smaller than the flow path width at any position in the region E1. Therefore, the flow path cross-sectional area of the concentrating portion 14 is smaller than the flow path cross-sectional area in the region E1. The flow path width at any position in the region E2 is larger than the flow path width of the concentrating portion 14. Therefore, the flow path cross-sectional area of the region E2 is larger than the flow path cross-sectional area of the concentrating portion 14.

The region E1 is formed between the end portion 10a and the inclined surfaces 12a and 12a of the insulator spacers 12A and 12B. The flow path width of the region E1 is a distance in the X-axis direction between the inner surfaces 16a and 16a of the side wall portions 16A and 16B between the end portion 10a and the insulator spacers 12A and 12B. Therefore, the flow path cross-sectional area of the region E1 is constant along the Y-axis direction between the end portion 10a and the insulator spacers 12A and 12B. Furthermore, the sample loading portion 11 is formed in a portion of the region E1, in which the flow path cross-sectional area is constant in the portion. The flow path width of the region E1 is a distance in the X-axis direction between the inclined surfaces 12a and 12a at a position corresponding to the inclined surfaces 12a and 12a of the insulator spacers 12A and 12B. Therefore, the flow path cross-sectional area of the region E1 is decreased at the position corresponding to the inclined surfaces 12a and 12a as the region E1 approaches the concentrating portion 14 from the end portion 10a side along the inclined surfaces 12a and 12a.

The region E2 is formed between the perpendicular surfaces 12b and 12b of the insulator spacers 12A and 12B and the end portion 10b. The perpendicular surfaces 12b and 12b is straight widened from the tops 12c and 12c in the X-axis direction. Accordingly, the flow path 15 is straight widened in the X-axis direction in a boundary portion LP between the concentrating portion 14 and the region E2. Therefore, the flow path width of the region E2, namely, the flow path cross-sectional area is rapidly increased in the boundary portion LP between the concentrating portion 14 and the region E2. The flow path width of the region E2 is a distance in the X-axis direction between the inner surfaces 16a and 16a of the side wall portions 16A and 16B. Therefore, the flow path cross-sectional area of the region E2 is constant along the Y-axis direction.

The accommodating container 2 has defining surfaces 25A and 25B which define the flow path cross-sectional area of the flow path 15 such that the support body 10 has the above-described shape. The defining surfaces 25A and 25B are formed of the inclined surfaces 12a and 12a and the perpendicular surfaces 12b and 12b of the insulator spacers 12A and 12B and a portion of the inner surfaces 16a and 16a of the side wall portions 16A and 16B, in which the insulator spacers 12A and 12B are not provided in the portion. The defining surfaces 25A and 25B have end portions (first end portions) 25a and 25a on the negative side in the Y-axis direction, and end portions (second end portions) 25b and 25b on the positive side.

The defining surfaces 25A and 25B have the tops (concentrating portion forming portion) 12c and 12c, which form the concentrating portion 14 described above, between the end portions 25a and 25a and the end portions 25b and 25b. In addition, the defining surfaces 25A and 25B have the inner surfaces (first portion) 16a and 16a and the inclined surfaces (first portion) 12a and 12a on a side closer to the negative side of the Y-axis direction than the tops 12c and 12c, namely, on an end portions 25a and 25a side. The inner surfaces 16a and 16a and the inclined surfaces 12a and 12a define the flow path cross-sectional area of the region E1. The flow path cross-sectional area defined by the tops 12c and 12c is smaller than the flow path cross-sectional area of the region E1 which is defined by the inner surfaces 16a and 16a and the inclined surfaces 12a and 12a. The defining surfaces 25A and 25B have the inner surfaces (second portion) 16a and 16a, which form the flow path cross section of the region E2, on a side closer to the positive side of the Y-axis direction than the tops 12c and 12c, namely, on an end portions 25b and 25b side. The flow path cross-sectional area of the region E2 which is defined by the inner surfaces 16a and 16a is larger than the flow path cross-sectional area defined by the tops 12c and 12c.

Figure 2:
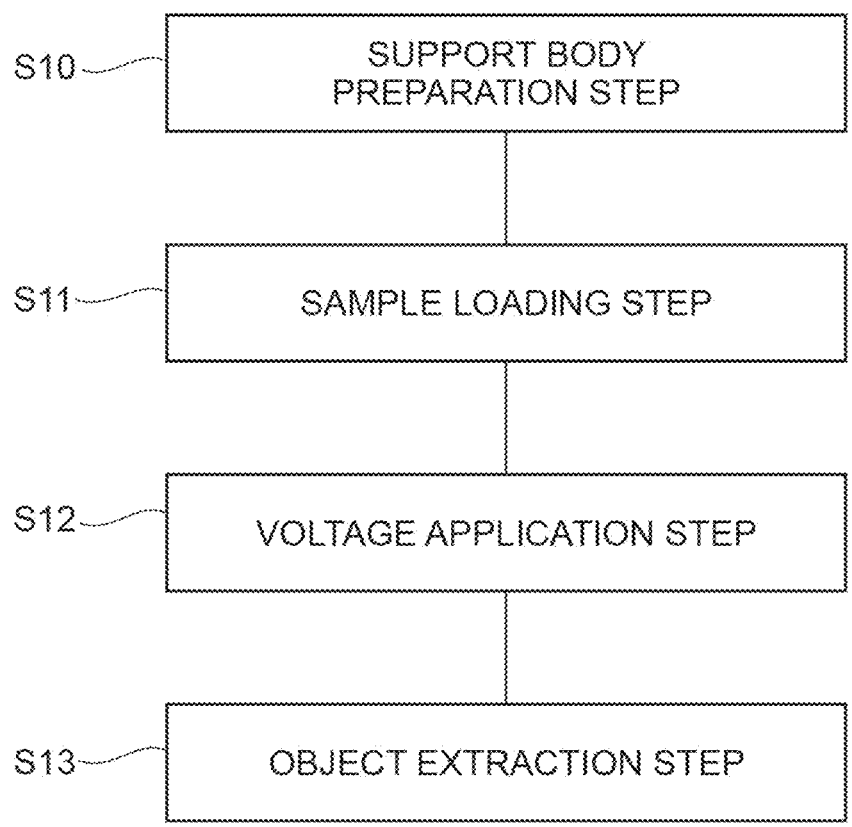
FIG. 2 is a flowchart illustrating a procedure of an electrophoresis method according to the present embodiment.

Next, an electrophoresis method according to the present embodiment will be described with reference to FIG. 2. FIG. 2 is a flowchart illustrating a procedure of the electrophoresis method according to the present embodiment. Furthermore, here, as one example of the electrophoresis method, a procedure for acquiring a DNA structure used as a DNA origami will be described. However, the electrophoresis method is not limited to the following procedure.

First, support body preparation step S10 of preparing the support body 10 as illustrated in FIG. 1 is executed. Here, an agarose gel (agarose content: 1%, concentration of TBE buffer: 0.5×, and additive: $MgCl_2$, 11 mM) is put into the accommodating container 2 to be solidified. Accordingly, the support body 10 is formed in the accommodating container 2. In this case, silicone rubber spacers are used as the insulator spacers 12A and 12B. Then, the support body 10 is put into the electrophoresis tank 3, together with the accommodating container 2. In addition, the phoresis buffer 5 (concentration of TBE buffer: 0.5× and additive: $MgCl_2$, 11 mM) is injected into the electrophoresis tank 3.

Next, sample loading step S11 for loading the sample 20 on the end portion 10a side of the support body 10 is executed. Here, as the sample 20, an unrefined solution containing a DNA structure that is the object 21 is used. The sample 20 is loaded in the sample loading portion 11 of the support body 10.

Next, voltage application step S12 of applying voltage to the support body 10 with the electrodes 6 and 7 to cause the end portion 10a and the end portion 10b to have different potentials and thus to cause the object 21 to move in the flow path 15 from the end portion 10a side to the end portion 10b side is executed. Here, electrophoresis is performed for one hour at a voltage of 50 V.

Here, the principle of separation and concentration of the object 21 will be described with reference to FIG. 3. FIG. 3 is a schematic view illustrating a state of a band of the object 21 in the vicinity of the concentrating portion 14. First, the relationship between applied voltage per unit length of the flow path 15 and the flow path cross-sectional area will be described. When the electrical resistance of a uniform conductor is R, the electrical resistivity is ρ, the length is L, and the cross-sectional area is A, the relationship of the following equation (1) is established.

$$R = \rho L / A \quad (1)$$

According to Ohm's law, a voltage V applied to the conductor is expressed by the following equation (2), where R is electric resistance and I is current. The relationship as illustrated in equation (3) is established between a voltage per unit length V/L and the cross-sectional area A from equations (1) and (2).

$$V = IR \quad (2)$$

$$V/L = I\rho/A \quad (3)$$

Here, since the electrical resistivity ρ is determined by a substance, the electrical resistivity ρ is constant in the flow path 15. In addition, according to Kirchhoff's first law, I flowing through the flow path cross section of the flow path 15 is constant in any cross section. Therefore, the voltage per unit length V/L applied to the flow path 15 is inversely proportional to the flow path cross-sectional area A.

As illustrated in FIG. 3, the flow path cross-sectional area is gradually decreased along the inclined surfaces 12a and 12a in the region E1 upstream of the concentrating portion 14. The voltage per unit length V/L applied to the flow path 15 is inversely proportional to the flow path cross-sectional area A. For this reason, the voltage in the flow path 15 increases gradually as the flow path 15 approaches the concentrating portion 14. Therefore, the movement speed of the object 21 increases gradually as the object 21 approaches the concentrating portion 14. For this reason, impurities are easily separated from the object 21, so that the object 21 can be separated with a high resolution in the concentrating portion 14. At this time, as illustrated in FIG. 3(a), the band of the object 21 has a shape that extends in the Y-axis direction at a position close to the concentrating portion 14 rather than a position apart from the concentrating portion 14. In addition, the band of the object 21 is deformed such that the dimension in the X-axis direction is decreased as the flow path cross-sectional area is narrowed. Therefore, the effect of concentration in the X-axis direction acts on the object 21.

The voltage is maximum in the concentrating portion 14, and a portion adjacent to the concentrating portion 14 in the region E2 is rapidly increased in flow path cross-sectional area, and thus the voltage decreases rapidly. Therefore, the movement speed of the object 21 decreases rapidly immediately after the object 21 has passed through the concentrating portion 14. Therefore, as illustrated in FIG. 3(b), the band of the object 21 is rapidly contracted in the Y-axis direction at a position adjacent to the downstream side of the concentrating portion 14. Accordingly, the effect of concentration in the Y-axis direction acts on the object 21.

Furthermore, after electrophoresis is performed for a predetermined time, the support body 10 is taken out from the electrophoresis tank 3 and is immersed in a staining solution (SYBR$^{(R)}$ Green I Nucleic Acid Gel Stain), and staining is performed under vibration for 30 minutes. Then, the support body 10 that is stained is observed with a transilluminator to confirm the position of the band of the object 21 to be extracted. In this case, when the band of the object 21 is loaded at a position (position where the effect of concentration and the effect of separation are highest) adjacent to the downstream side of the concentrating portion 14, the next object extraction step S13 is executed. When the band of the object 21 has not reached the position, electrophoresis is repeated again.

As described above, when the band of the object 21 is loaded at a desired position, object extraction step S13 of extracting the object 21 from the support body 10 is executed. Here, only the band of the object 21 is cut out using a cutter. Next, the object 21 is extracted from the cut piece by using an extractor (gel extraction spin column). As described above, the process illustrated in FIG. 2 is completed.

Next, the effects of the electrophoresis method, the electrophoresis system 1, and the accommodating container 2 for electrophoresis according to the present embodiment will be described.

The electrophoresis method according to the present embodiment is an electrophoresis method for causing the sample 20 containing the object 21 to move inside the support body 10 to separate other substances and the object 21 from each other, the method including: support body preparation step S10 of preparing the support body 10 that includes the end portion 10a on the negative side in the Y-axis direction and the end portion 10b on the positive side and forms the flow path 15 of the sample 20 between the end portion 10a and the end portion 10b; sample loading step S11 of loading the sample 20 on the end portion 10a side of the support body 10; and voltage application step S12 of applying voltage to cause the end portion 10a and the end portion 10b to have different potentials and thus to cause the object 21 to move in the flow path 15 to the positive side of the Y-axis direction (end portion 10b side). The support body 10 includes the concentrating portion 14, which concentrates the object 21, between the end portion 10a and the end portion 10b. The flow path cross-sectional area of the concentrating portion 14 is smaller than the flow path cross-sectional area in the region E1 closer to the end portion 10a side than the concentrating portion 14. The flow path cross-sectional area of the region E2 closer to the end portion 10b side than the concentrating portion 14 is larger than the flow path cross-sectional area of the concentrating portion 14.

In the electrophoresis method according to the present embodiment, the support body 10 includes the concentrating portion 14, which concentrates the object 21, between the end portion 10a and the end portion 10b. The flow path cross-sectional area of the concentrating portion 14 is smaller than the flow path cross-sectional area in the region E1 closer to the end portion 10a side than the concentrating portion 14. When the object 21 moves in the flow path 15 in voltage application step S12, the object 21 is separated from other substances in the region E1, and then passes through the concentrating portion 14. At this time, since the object 21 passes through the concentrating portion 14 having a small flow path cross-sectional area, the object 21 is concentrated in the X-axis direction. In addition, the flow path cross-sectional area of the region E2 closer to the end portion 10b side than the concentrating portion 14 is larger than the flow path cross-sectional area of the concentrating portion 14. Since the voltage of the flow path 15 decreases at a location where the flow path cross-sectional area is increased, the movement speed of the object 21 decreases. Therefore, after the object 21 has passed through the concentrating portion 14, the movement speed of the object 21 decreases in the vicinity of the boundary portion LP between the concentrating portion 14 and the region E2. Accordingly, after the object 21 has passed through the concentrating portion 14, the object 21 is concentrated in the Y-axis direction. As described above, the electrophoresis method can also concentrate the object 21 in addition to separating the object 21 from other substances.

When the DNA origami is separated by electrophoresis, the DNA origami can be separated by a characteristic other than molecular weight. In this case, since the electrophoresis method according to the present embodiment is used, the effect of concentration in addition to separation by usual electrophoresis can be exhibited.

The electrophoresis system 1 according to the present embodiment which cause the sample 20 containing the object 21 to move inside the support body 10 to separate other substances and the object 21 from each other includes the support body 10 that includes the end portion 10a on the negative side in the Y-axis direction and the end portion 10b on the positive side and forms the flow path 15 of the sample 20 between the end portion 10a and the end portion 10b; and the electrodes 6 and 7 that apply voltage to cause the end portion 10a and the end portion 10b to have different potentials and thus to cause the object 21 of the sample 20, which is loaded on the end portion 10a side, to move in the flow path 15 from the end portion 10a side to the end portion 10b side. The support body 10 includes the concentrating portion 14, which concentrates the object 21, between the end portion 10a and the end portion 10b. The flow path cross-sectional area of the concentrating portion 14 is smaller than the flow path cross-sectional area in the region E1 closer to the end portion 10a side than the concentrating portion 14. The flow path cross-sectional area of the region E2 closer to the end portion 10b side than the concentrating portion 14 is larger than the flow path cross-sectional area of the concentrating portion 14.

In the electrophoresis system 1 according to the present embodiment, the same effects as in the above-described electrophoresis method can be obtained.

The accommodating container 2 for electrophoresis according to the present embodiment which accommodates the support body 10 in the electrophoresis method for causing the sample 20 containing the object 21 to move inside the support body 10 to separate other substances and the object 21 from each other includes the defining surfaces 25A and 25B that define the flow path cross-sectional area of the flow path 15 of the sample 20, the flow path 15 extending in the Y-axis direction inside the support body 10. The defining surfaces 25A and 25B extend along the Y-axis direction, and have the end portions 25a and 25a on the negative side in the Y-axis direction, the end portions 25b and 25b on the positive side, and the tops 12c and 12c, which form the concentrating portion 14 that concentrates the object 21, between the end portions 25a and 25a and the end portions 25b and 25b. The flow path cross-sectional area defined by the tops 12c and 12c is smaller than the flow path cross-sectional area defined by the inner surfaces 16a and 16a and the inclined surfaces 12a and 12a that are closer to the end portions 25a and 25a side than the tops 12c and 12c. The flow path cross-sectional area defined by the perpendicular surfaces 12b and 12b and the inner surfaces 16a and 16a that are closer to the end portions 25b and 25b side than the tops 12c and 12c is larger than the flow path cross-sectional area defined by the tops 12c and 12c.

In the accommodating container 2 for electrophoresis according to the present embodiment, the tops 12c and 12c, the inner surfaces 16a and 16a and the inclined surfaces 12a and 12a on the end portions 25a and 25a side, and the inner surfaces 16a and 16a on the end portions 25b and 25b side of the defining surfaces 25A and 25B can form the concentrating portion 14, the region E1, and the region E2 of the support body 10 in the electrophoresis method and the electrophoresis system 1 described above. Therefore, when the support body 10 accommodated in the accommodating container 2 for electrophoresis according to the present embodiment is used, the same effects as in the electrophoresis method and the electrophoresis system 1 described above can be obtained.

In the electrophoresis method and the electrophoresis system 1 according to the present embodiment, the insulator spacers 12A and 12B define the flow path cross-sectional area to form the concentrating portion 14. In addition, in the accommodating container 2 for electrophoresis according to the present embodiment, the tops 12c and 12c are formed by the insulator spacers 12A and 12B. In this case, the insulator spacers 12A and 12B can define the flow path cross-sectional area to a desired size in a state where the insulator spacers 12A and 12B prevent electricity from leaking to portions other than the flow path 15 in the concentrating portion 14.

In the electrophoresis method and the electrophoresis system 1 according to the present embodiment, the flow path 15 is widened in the X-axis direction in the boundary portion LP between the concentrating portion 14 and the region E2. In addition, in the accommodating container 2 for electrophoresis according to the present embodiment, the defining surfaces 25A and 25B are widened in the X-axis direction in the perpendicular surfaces 12b and 12b forming the boundary portion LP between the tops 12c and 12c and the inner surfaces 16a and 16a. In this case, since the flow path cross-sectional area is rapidly widened in the vicinity of the boundary portion LP between the concentrating portion 14 and the region E2, the voltage of the flow path 15 decreases rapidly. Therefore, after the object 21 has passed through the concentrating portion 14, the movement speed of the object 21 decreases rapidly in the vicinity of the boundary portion LP between the concentrating portion 14 and the region E2. Accordingly, after the object 21 has passed through the concentrating portion 14, the object 21 is favorably concentrated in the Y-axis direction.

In the electrophoresis method and the electrophoresis system 1 according to the present embodiment, the flow path cross-sectional area of the region E1 is decreased as the region E1 approaches the concentrating portion 14 from the end portion 10a side. In addition, in the accommodating container 2 for electrophoresis according to the present embodiment, the flow path cross-sectional area defined by the inner surfaces 16a and 16a and the inclined surfaces 12a and 12a on the end portions 25a and 25a side is narrowed as the inner surfaces 16a and 16a and the inclined surfaces 12a and 12a approach the tops 12c and 12c from the end portions 25a and 25a side. In this case, the voltage of the flow path 15 in the region E1 increases gradually as the flow path 15 approaches the concentrating portion 14. Therefore, the movement speed of the object 21 increases gradually, and thus the resolution of separation of the object 21 is improved.

The present invention is not limited to the above-described embodiment.

For example, in the above-described embodiment, DNA is adopted as the object 21; however, nucleic acid such as RNA or proteins, a mixture of nucleic acid and proteins, a complex of nucleic acid and metal nanoparticles, or the like may be adopted. Due to the molecular sieving effect of the support body 10, the object 21 described above exhibits a movement speed that is dependent on molecular weight, structure, a state of modification, a state of charge, and the like. Therefore, the object 21 described above is separated from impurities.

The gel of the support body 10 is not limited to an agarose gel, and may be, for example, a polyacrylamide gel. Furthermore, when a polyacrylamide gel is used as the support body 10, the support body 10 may not be in a horizontal loading where the object 21 moves in a horizontal direction, but be in a vertical loading where the object moves in an upward and downward direction. In addition, a gel such as starch may be used as the gel of the support body 10. In addition, a sol may be adopted as the support body 10. As other types of the support bodies 10, substances other than a gel, such as a cellulose film or exposed paper, may be adopted. In addition, a cell aggregation may be subjected to phoresis in the support body 10 in a jelly state. In addition, a solution such as an aqueous solution may be adopted as the support body 10.

Figure 5:
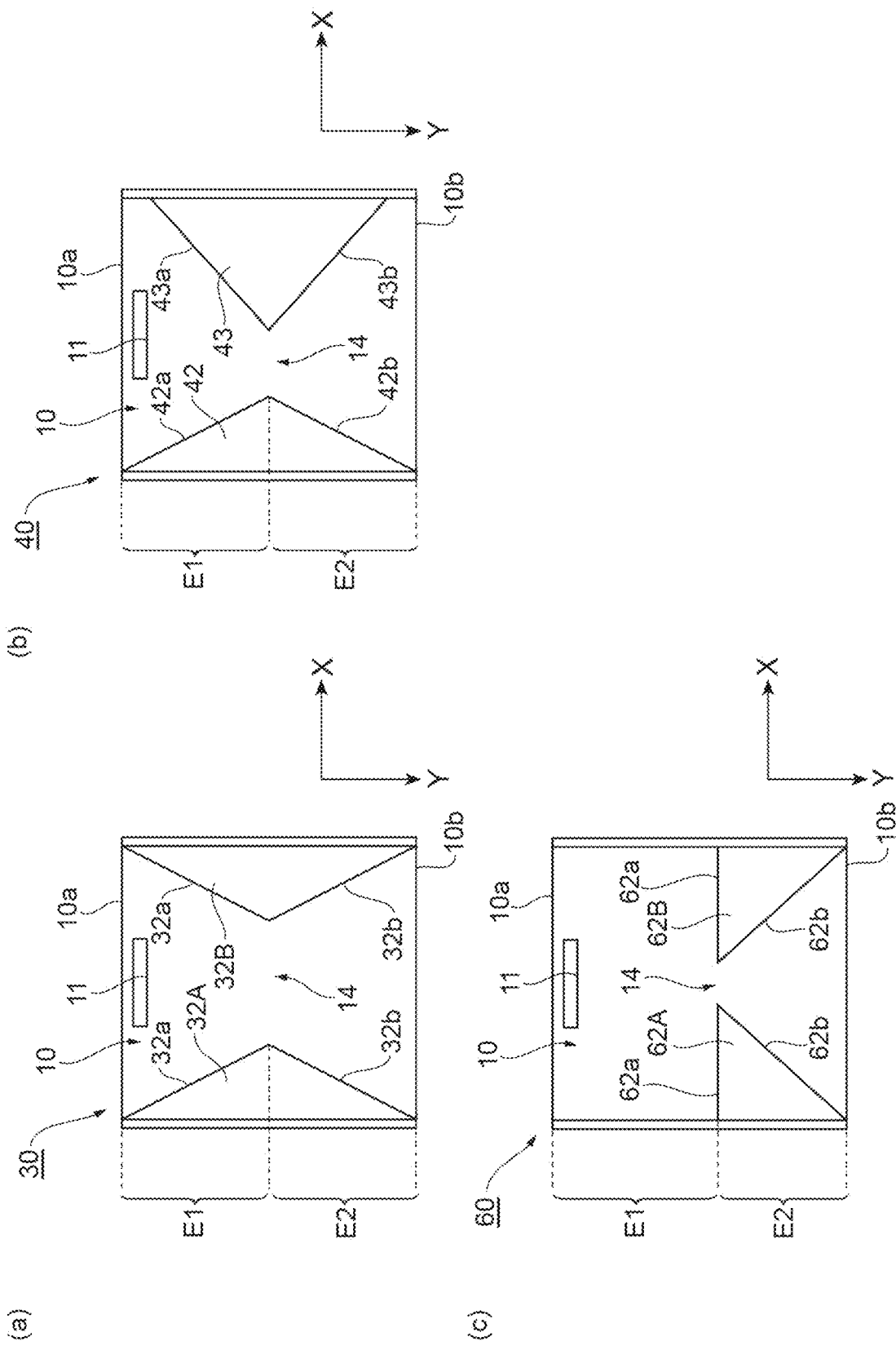
FIGS. 5(a), 5(b), and 5(c) are plan views illustrating accommodating containers according to modification examples.
Figure 6:
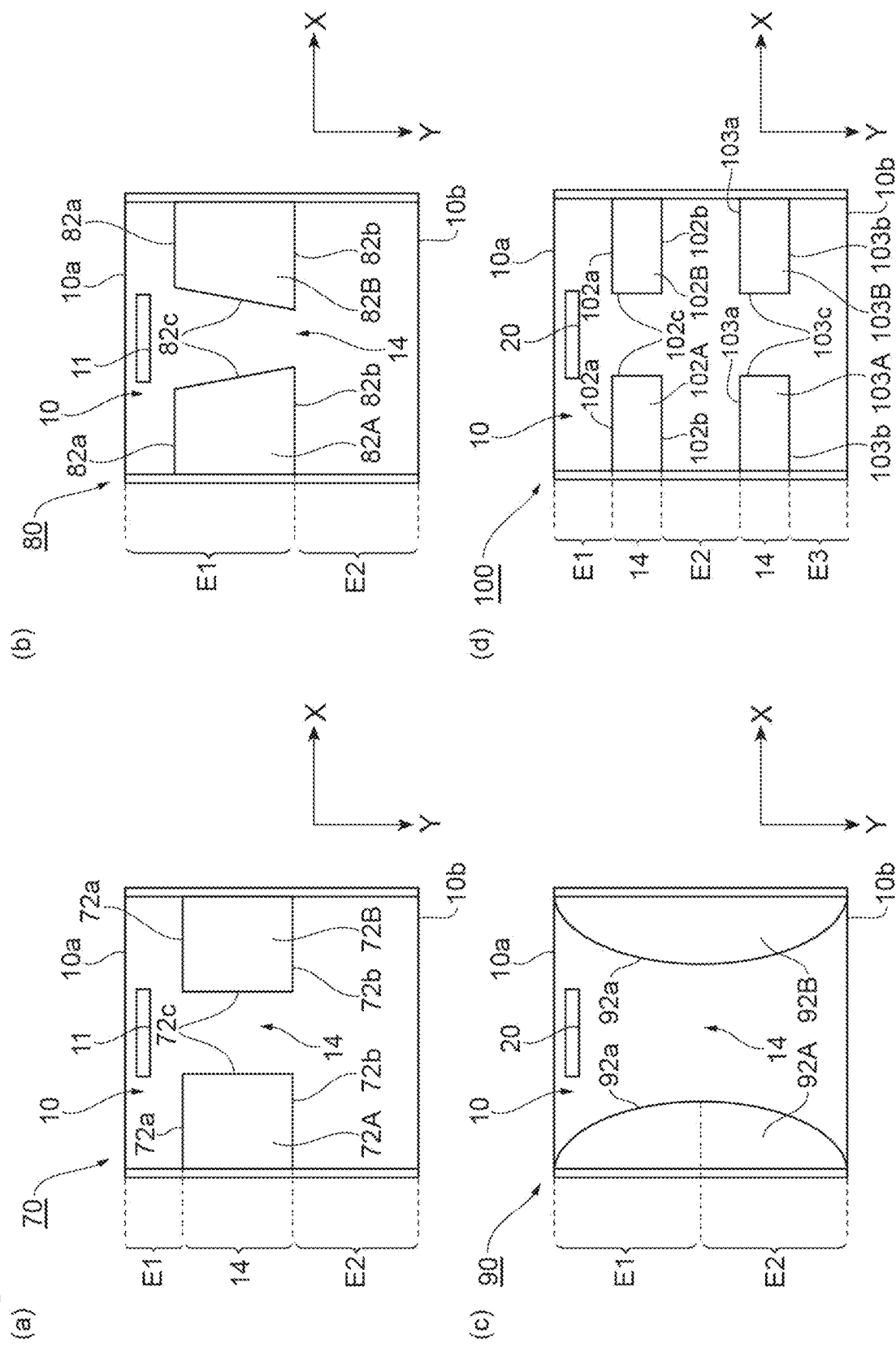
FIGS. 6(a), 6(b), 6(c), and 6(d) are plan views illustrating accommodating containers according to modification examples.

For example, the shape of the insulator spacer, namely, the shape of the support body 10 is not limited to the above-described embodiment, and may be appropriately changed without departing from the concept of the present invention. For example, modification examples illustrated in FIGS. 5 and 6 may be adopted.

Insulator spacers 32A and 32B of an accommodating container 30 illustrated in FIG. 5(a) are gradually increased in flow path cross-sectional area as the insulator spacers 32A and 32B extend from the concentrating portion 14 toward the end portion 10b. In addition, the insulator spacers 32A and 32B extend over the entire region in the Y-axis direction. The insulator spacers 32A and 32B include inclined surfaces 32a and 32a that are inclined to a center side as the inclined surfaces 32a and 32a extend from the position of the end portion 10a toward the positive side of the Y-axis direction, and inclined surfaces 32b and 32b that are inclined to the center side as the inclined surfaces 32b and 32b extend from the position of the end portion 10b toward the negative side of the Y-axis direction.

Insulator spacers 42 and 43 of an accommodating container 40 illustrated in FIG. 5(b) are asymmetric to each other. The insulator spacer 42 having inclined surfaces 42a and 42b has the same configuration as that of the insulator spacer 32A of FIG. 5(a). The insulator spacer 43 has inclined surfaces 43a and 43b that further extend to the center position than the insulator spacer 42.

Insulator spacers 62A and 62B of an accommodating container 60 illustrated in FIG. 5(c) have shapes obtained by changing the inclined surfaces 32a and 32a of the insulator spacers 32A and 32B of FIG. 5(a) to perpendicular surfaces 62a and 62a. The insulator spacers 62A and 62B have inclined surfaces 62b and 62b that are the same as the inclined surfaces 32b and 32b.

Insulator spacers 72A and 72B of an accommodating container 70 illustrated in FIG. 6(a) define the flow path cross-sectional area such that the concentrating portion 14 is widened in the Y-axis direction. The insulator spacers 72A and 72B include perpendicular surfaces 72a and 72a on the end portion 10a side, perpendicular surfaces 72b and 72b on the end portion 10b side, and flat surfaces 72c and 72c that extend straight in the Y-axis direction to be parallel to each other. In this case, a region closer to the end portion 10a side than the perpendicular surfaces 72a and 72a is the region E1 upstream of the concentrating portion 14, and a region closer to the end portion 10b side than the perpendicular surfaces 72b and 72b is the region E2 downstream of the concentrating portion 14. Since the concentrating portion 14 is formed in a wide range in the Y-axis direction, the movement speed of the object 21 can be increased in a wide range.

Insulator spacers 82A and 82B of an accommodating container 80 illustrated in FIG. 6(b) have a configuration where the flat surfaces 72c and 72c of the insulator spacers 72A and 72B illustrated in FIG. 6(a) are replaced with inclined surfaces 82c and 82c. The insulator spacers 82A and 82B have perpendicular surfaces 82a, 82a, 82b, and 82b that are the same as the perpendicular surfaces 72a, 72a, 72b, and 72b.

Insulator spacers 92A and 92B of an accommodating container 90 illustrated in FIG. 6(c) are not configured such that the flat surfaces are bent as in the other forms, but have curved surfaces 92a and 92a that are curved to protrude toward the center position. In this case, the concentrating portion 14 is formed at the position of the tops of the curved surfaces 92a and 92a.

An accommodating container 100 illustrated in FIG. 6(d) includes a plurality of the concentrating portions 14. The accommodating container 100 includes insulator spacers 102A and 102B and insulator spacers 103A and 103B similar to the insulator spacers 72A and 72B. The insulator spacers 102A and 102B include perpendicular surfaces 102a and 102a on the end portion 10a side, perpendicular surfaces 102b and 102b on the end portion 10b side, and flat surfaces 102c and 102c that extend straight in the Y-axis direction to be parallel to each other. The insulator spacers 103A and 103B include perpendicular surfaces 103a and 103a on the end portion 10a side, perpendicular surfaces 103b and 103b on the end portion 10b side, and flat surfaces 103c and 103c that extend straight in the Y-axis direction to be parallel to each other. Accordingly, the region E1, the concentrating portion 14, the region E2, the concentrating portion 14, and a region E3 are formed in order from the negative side of the Y-axis direction. With respect to the concentrating portion 14 on the upstream side, the region E1 corresponds to a "first region" in the claims, and the region E2 corresponds to a "second region" in the claims. With respect to the concentrating portion 14 on the downstream side, the region E2 corresponds to the "first region" in the claims, and the region E3 corresponds to the "second region" in the claims.

Figure 7:
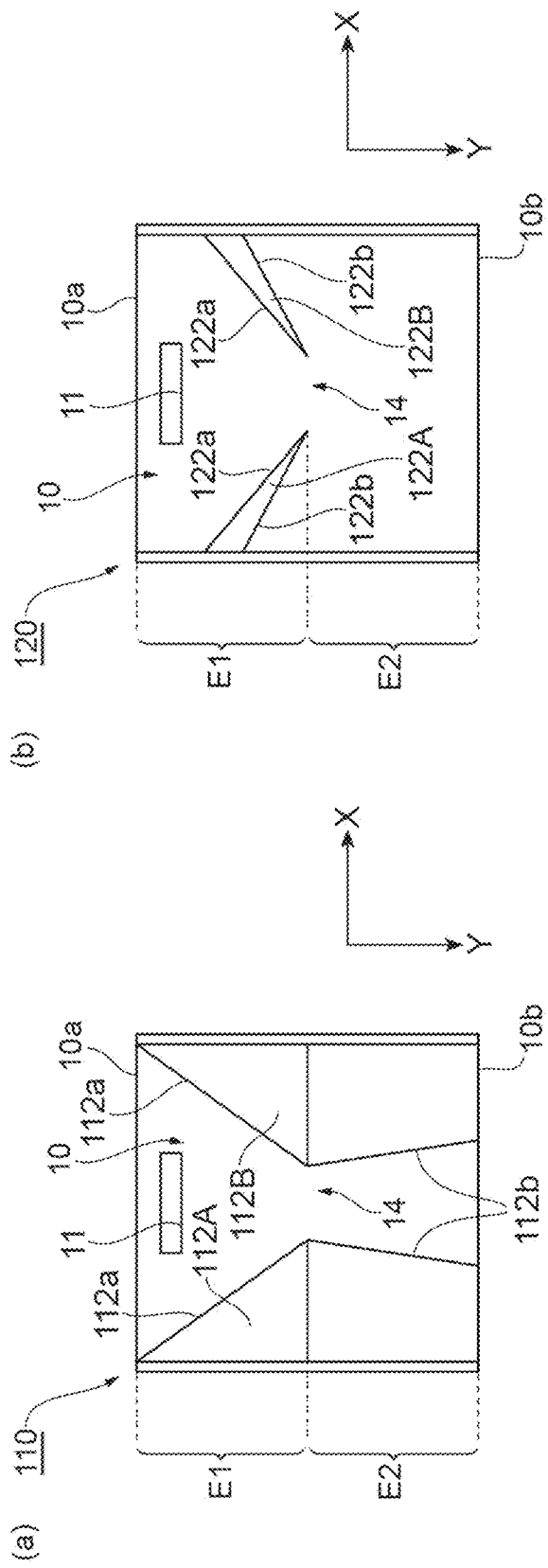
FIGS. 7(a) and 7(b) are plan views illustrating accommodating containers according to modification examples.

In the mode illustrated in FIG. 1, the flow path 15 is widened in the boundary portion in a direction forming 90° with respect to the Y-axis direction (namely, X-axis direction). Instead, as illustrated in FIG. 7, the flow path 15 may be widened at any angle in the boundary portion between the concentrating portion 14 and the region E2 as long as the flow path 15 is widened in a direction intersecting the Y-axis direction. For example, an accommodating container 110 illustrated in FIG. 7(a) includes spacers 112A and 112B having inclined surfaces 112b and 112b that extend from the concentrating portion 14 to the positive side of the Y-axis direction. In this case, the flow path 15 is widened in the boundary portion in a direction where the angle with respect to the Y-axis direction is larger than 0° (state where the inclined surface 112*b* is parallel to the Y-axis direction) and is smaller than 90°. In addition, an accommodating container 120 illustrated in FIG. 7(*b*) includes spacers 122A and 122B having inclined surfaces 122*b* and 122*b* that extend from the concentrating portion 14 to the negative side of the Y-axis direction. In this case, the flow path 15 is widened in the boundary portion in a direction where the angle with respect to the Y-axis direction is larger than 90° and is smaller than that of inclined surfaces 122*a* and 122*a* that are the defining surfaces of the region E1.

Figure 8:
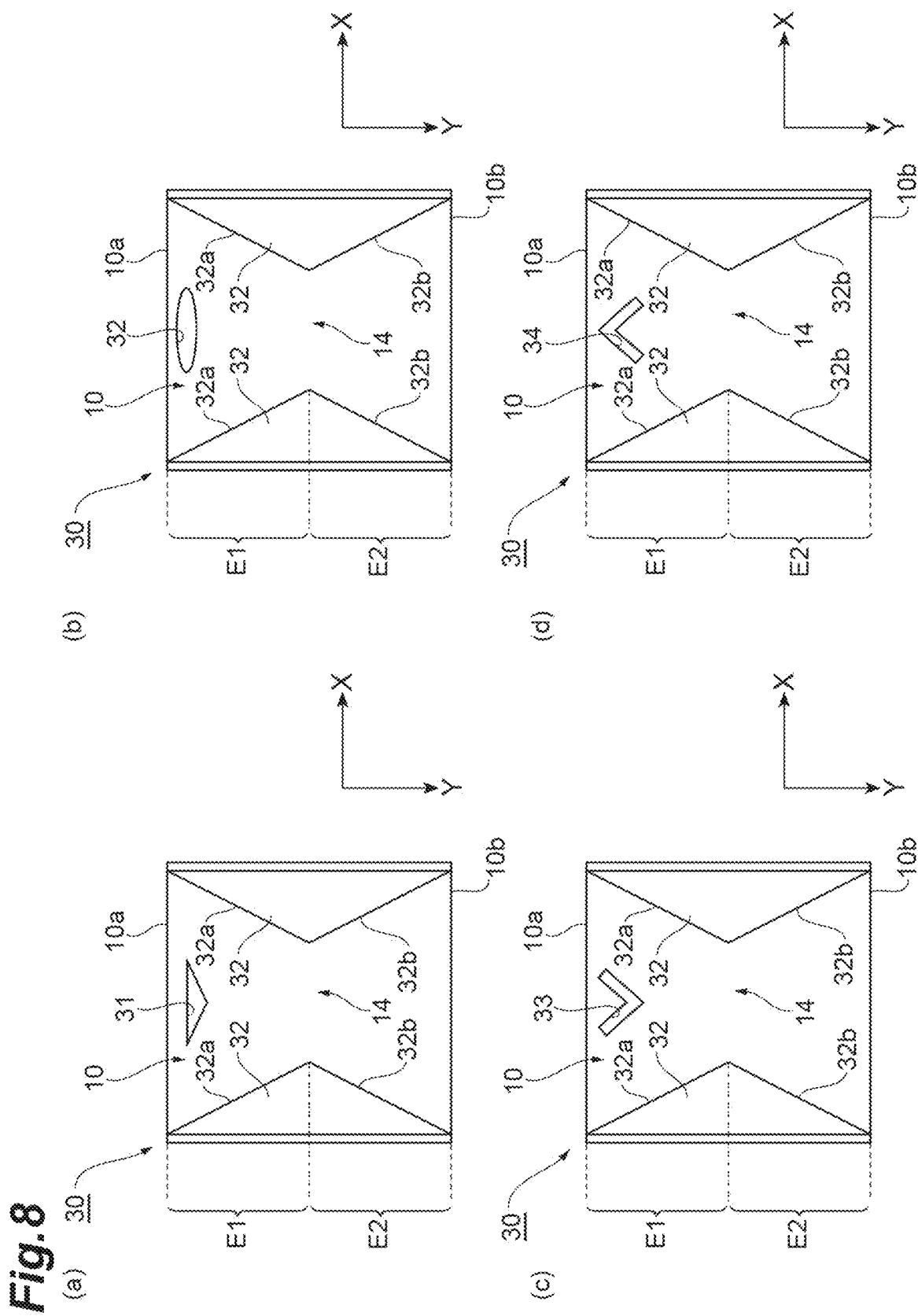
FIGS. 8(a), 8(b), 8(c), and 8(d) are plan views illustrating accommodating containers according to modification examples.

In addition, as illustrated in FIG. 8, the shape of the sample loading portion may be appropriately changed. For example, a sample loading portion 31 of FIG. 8(*a*) has a triangular shape protruding to the negative side of the Y-axis direction. A sample loading portion 32 of FIG. 8(*b*) has an elliptical shape. A sample loading portion 33 of FIG. 8(*c*) extends to the negative side of the Y-axis direction as the sample loading portion 33 extends away from the center position in the X-axis direction.

In addition, in an electrophoresis system according to a modification example illustrated in FIG. 8(*d*), the support body 10 includes a sample loading portion 34 in which the sample 20 is loaded, and the sample loading portion 34 extends to the end portion 10*b* side as the sample loading portion 34 extends away from the center position in the X-axis direction. Namely, in an electrophoresis method according to the modification example, in sample loading step S11, the sample 20 is loaded in the sample loading portion 34 that extends to the end portion 10*b* side as the sample loading portion 34 extends away from the center position in the X-axis direction. When the concentrating portion 14 is formed at the center position, a difference between a distance from the sample 20, which is loaded in the vicinity of the center position of the sample loading portion 34, to the concentrating portion 14 and a distance from the sample 20, which is loaded at a position away from the center position, to the concentrating portion 14 can be decreased. Accordingly, the timing that the object 21 in the sample loading portion 34 reaches the concentrating portion 14 can be made uniform.

In addition, the support body 10 illustrated in FIG. 9 may be adopted to prevent damage to the support body 10. Furthermore, FIG. 9(*b*) is a view of the accommodating container 30 when seen in a direction where the end portion 10*b* is the front. In the example of FIG. 9, a high-concentration agarose gel 10B is loaded on a wall portion side of the accommodating container 30, and a low-concentration agarose gel 10A of which the concentration is set to a concentration suitable for the object 21 is loaded in an inner region. The higher the concentration of the agarose is, the stronger the strength of the gel is, and a gel having a concentration of 4% or less is generally used for separation of DNA. As a result, an agarose having a concentration of 4% is used as the high-concentration agarose gel 10B. An agarose gel having a concentration of 1% is used as the low-concentration agarose gel 10A. Furthermore, the entirety of the support body 10 may be formed of the high-concentration agarose gel 10B.

In the embodiment and the modification examples described above, the support body is formed in a desired shape by using the insulator spacers. Instead, the side wall portions themselves of the accommodating container may have shapes corresponding to the insulator spacers. In this case, the side wall portions of the accommodating container are required to be formed of insulators. In addition, voltage is applied to the support body in a state where the support body is accommodated in the accommodating container; however, voltage may be applied to the support body in a state where the support body is removed from the accommodating container. Namely, the support body may adopt any configuration as long as when voltage is applied to the support body, insulation properties are secured at locations where the insulator spacers in the embodiment and the modification examples are provided.

Figure 10:
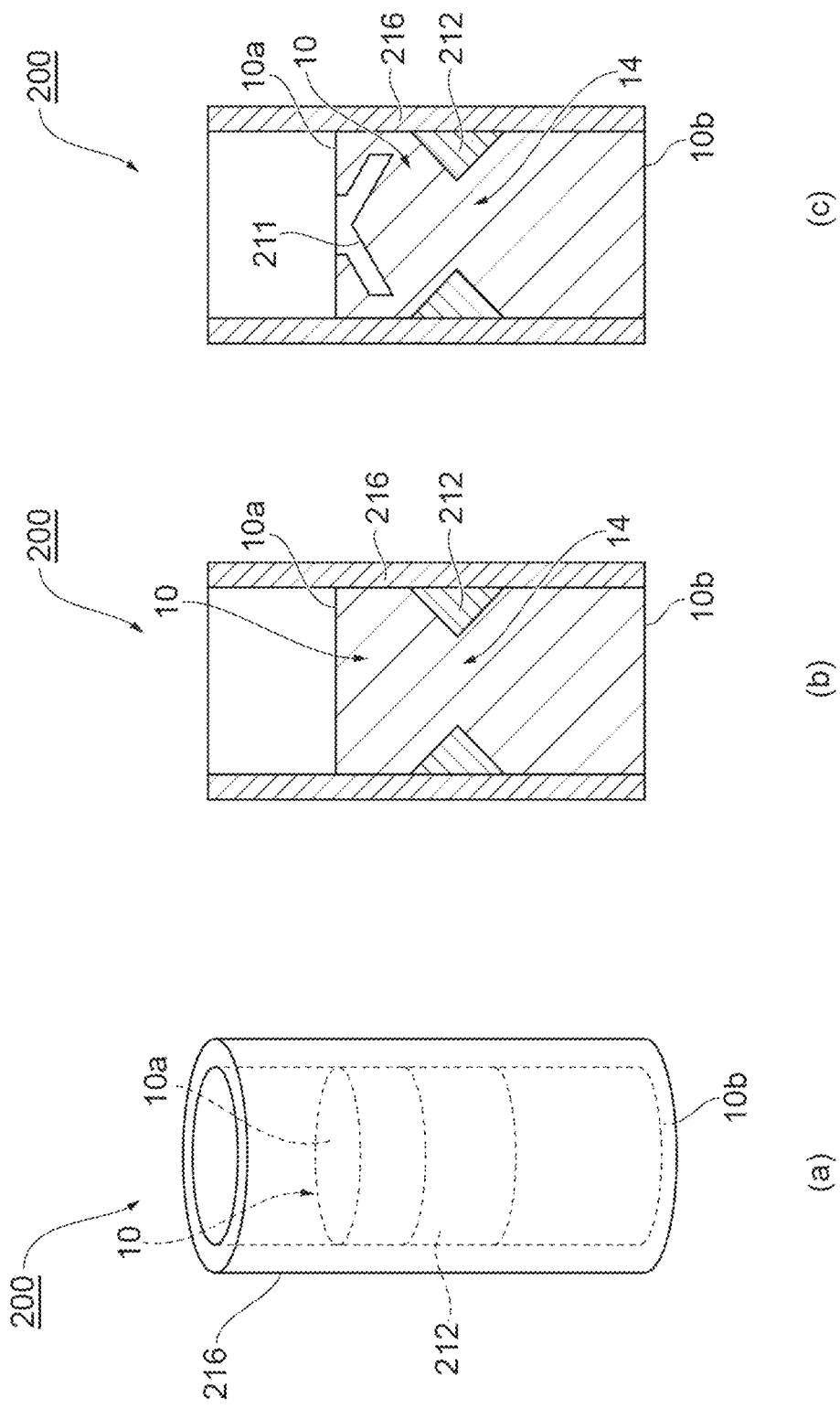
FIGS. 10(a), 10(b), and 10(c) are plan views illustrating accommodating containers according to modification examples.

In addition, in the above-described embodiment, the support body has a flat plate shape, and the size of the flow path width is changed in the X-axis direction. Instead, the support body may adopt a configuration where the flow path width is changed in all directions. For example, as illustrated in FIG. 10, an accommodating container 200 formed of a cylindrical member may be adopted. The accommodating container 200 includes an insulator spacer 212 in a wall portion 216 having a cylindrical shape such that the inner diameter is decreased in the vicinity of the center in a longitudinal direction. In this case, a portion corresponding to the top of the insulator spacer 212 serves as the concentrating portion 14. Furthermore, the end portion 10*a* of the support body 10 is provided below an upper end portion of the wall portion 216. In this case, a space above the end portion 10*a* may be used as the sample loading portion. In such a manner, the sample loading portion may not be necessarily formed inside the support body 10. Alternatively, as illustrated in FIG. 10(*c*), a sample loading portion 211 may be formed to penetrate into the support body 10 from the end portion 10*a*.

In addition, in the above-described embodiment, since the support body 10 has a constant thickness in the regions E1 and E2 and the concentrating portion 14 and the defining surfaces are provided at positions to face each other in the X-axis direction, the flow path cross-sectional area of the concentrating portion 14 is decreased. Instead, the thickness may be changed to form the concentrating portion 14. For example, an accommodating container 300 illustrated in FIG. 11(*a*) does not include spacers facing each other in the X-axis direction. Accordingly, the dimension in the X-axis direction of the support body 10 is constant in the regions E1 and E2 and the concentrating portion 14. Meanwhile, as illustrated on the right side of FIG. 11(*a*), on an upper surface side in the thickness direction of the support body 10, an upper surface 10*e* of the region E1 is inclined such that the thickness is reduced from the end portion 10*a* toward the concentrating portion 14, and an upper surface 10*f* of the region E2 is inclined such that the thickness is increased from the concentrating portion 14 toward the end portion 10*b*. Accordingly, the thickness of the concentrating portion 14 of the support body 10 is decreased, and thus the flow path cross-sectional area of the concentrating portion 14 is smaller than the cross-sectional areas of the regions E1 and E2.

Figure 11:
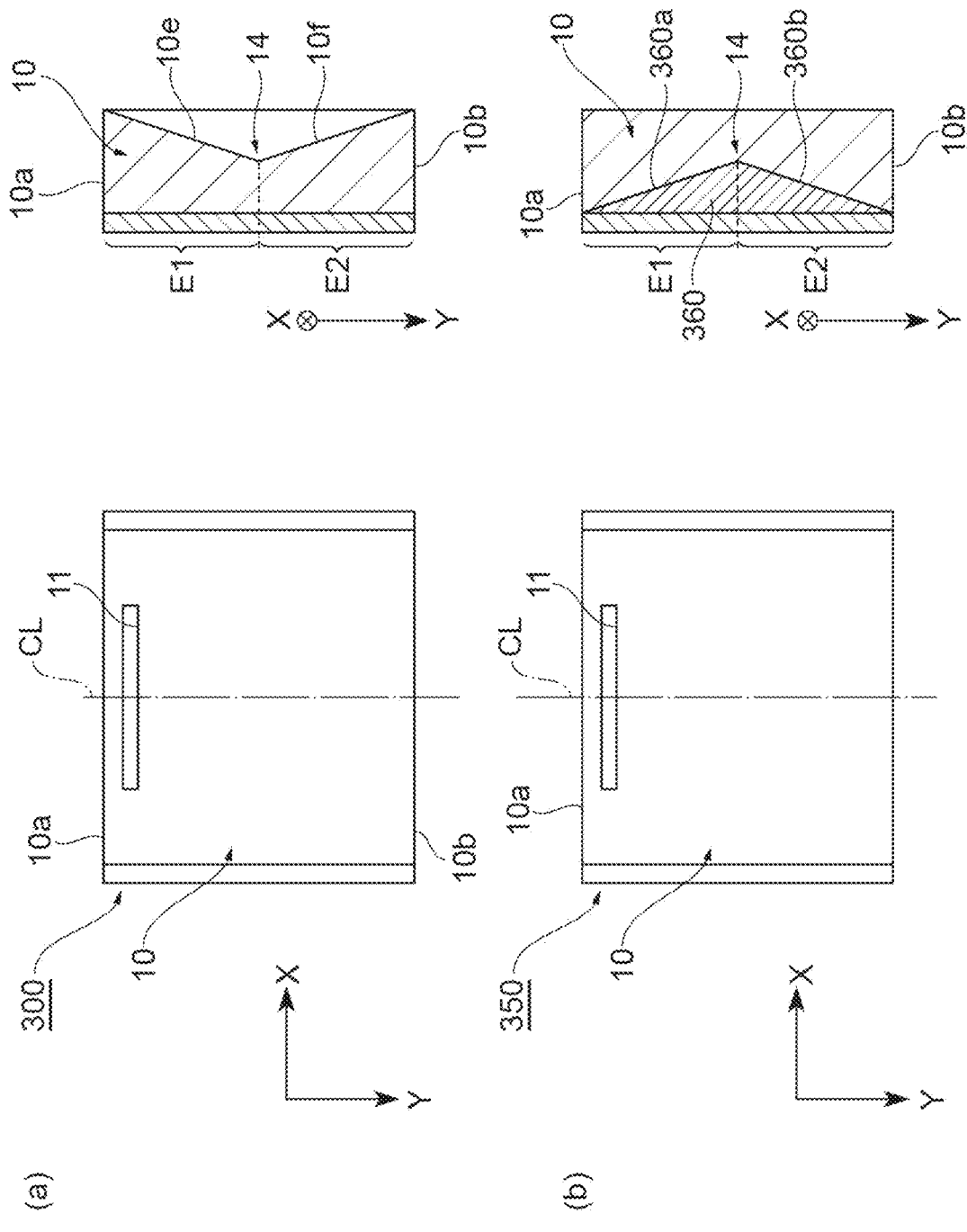
FIGS. 11(a) and 11(b) are plan views illustrating accommodating containers according to modification examples.

An accommodating container 350 illustrated in FIG. 11(*b*) does not include spacers facing each other in the X-axis direction. Accordingly, the dimension in the X-axis direction of the support body 10 is constant in the regions E1 and E2 and the concentrating portion 14. Meanwhile, as illustrated on the right side of FIG. 11(*b*), a spacer 360 is provided on a bottom surface side in the thickness direction of the support body 10. A defining surface 360*a* of the region E1 of the spacer 360 is inclined to an upper surface side from the end portion 10*a* toward the concentrating portion 14, and a defining surface 360*b* of the region E2 is inclined to a bottom surface side from the concentrating portion 14 toward the end portion 10b. Accordingly, the thickness of the concentrating portion 14 of the support body 10 is decreased, and thus the flow path cross-sectional area of the concentrating portion 14 is smaller than the cross-sectional areas of the regions E1 and E2. Furthermore, the configuration of FIG. 11(a) and the configuration of FIG. 11(b) may be combined. In addition, a configuration where the dimension in the X-axis direction of the concentrating portion 14 is narrowed may be added to the configurations illustrated in FIGS. 11(a) and 11(b) and the configuration where both are combined. Furthermore, the concentrating portion 14 may be formed in any manner as long as the flow path cross-sectional area of the concentrating portion 14 is smaller than those of the regions E1 and E2. However, it is preferable that the dimension in the X-axis direction is not widened at the position of the concentrating portion 14. In addition, it is preferable that the dimension in the thickness direction is not widened at the position of the concentrating portion 14.

In the embodiment illustrated in FIG. 1, electrophoresis according to a mode called agarose gel electrophoresis by a submarine electrophoresis device has been provided as an example. However, the type of a method used as electrophoresis is not particularly limited.

For example, polyacrylamide gel electrophoresis by slab electrophoresis devices 400 and 450 illustrated in FIGS. 13(a) and 13(b) may be adopted. In the method, as illustrated in FIG. 12, an accommodating container 402 is loaded to stand in a vertical direction. Namely, the support body 10 is loaded such that the end portion 10a faces upward and the end portion 10b faces downward. The accommodating container 402 includes side wall portions 126A and 126B, and also includes a pair of wall portions facing each other in the thickness direction of the support body 10 (wall portions are present on both of a front side and a back side of the sheet of FIG. 12). As illustrated in FIG. 12(a), the sample loading portion 11 that is a groove formed from above is formed in the end portion 10a. Alternatively, as illustrated in FIG. 12(b), the end portion 10a may be loaded at a position lower than an upper end of the accommodating container 402 so that the sample is directly loaded on the end portion 10a. In such a manner, the sample may be loaded outside the support body 10.

In the accommodating container 402 assembled in the slab electrophoresis device 400 illustrated in FIG. 13(a), only the end portions 10a and 10b of the support body 10 are in contact with a phoresis buffer 405. Namely, a tank 410 of the phoresis buffer 405 is attached to an upper end side of the accommodating container 402, and a tank 420 of the phoresis buffer 405 is attached to a lower end side. The tank 410 is connected to the accommodating container 402 via a connection portion 408 to communicate with an upper end side opening of the accommodating container 402. In addition, a negative electrode 411 is loaded in the tank 410. The tank 420 communicates with a lower end side opening of the accommodating container 402. A positive electrode 422 is loaded in the tank 420. Alternatively, the slab electrophoresis device 450 illustrated in FIG. 13(b) is provided with a tank 460 that communicates with the upper end side opening of the accommodating container 402, and a tank 470 that communicates with the lower end side opening thereof. The tanks 460 and 470 have depths such that substantially the entire length of the accommodating container 402 is immersed. The negative electrode 411 is loaded in a bottom portion of the tank 460, and the positive electrode 422 is loaded in a bottom portion of the tank 470. In such a manner, the electrodes may not be physically loaded on both of the end portion 10a side and the end portion 10b side of the support body 10.

Figure 14:
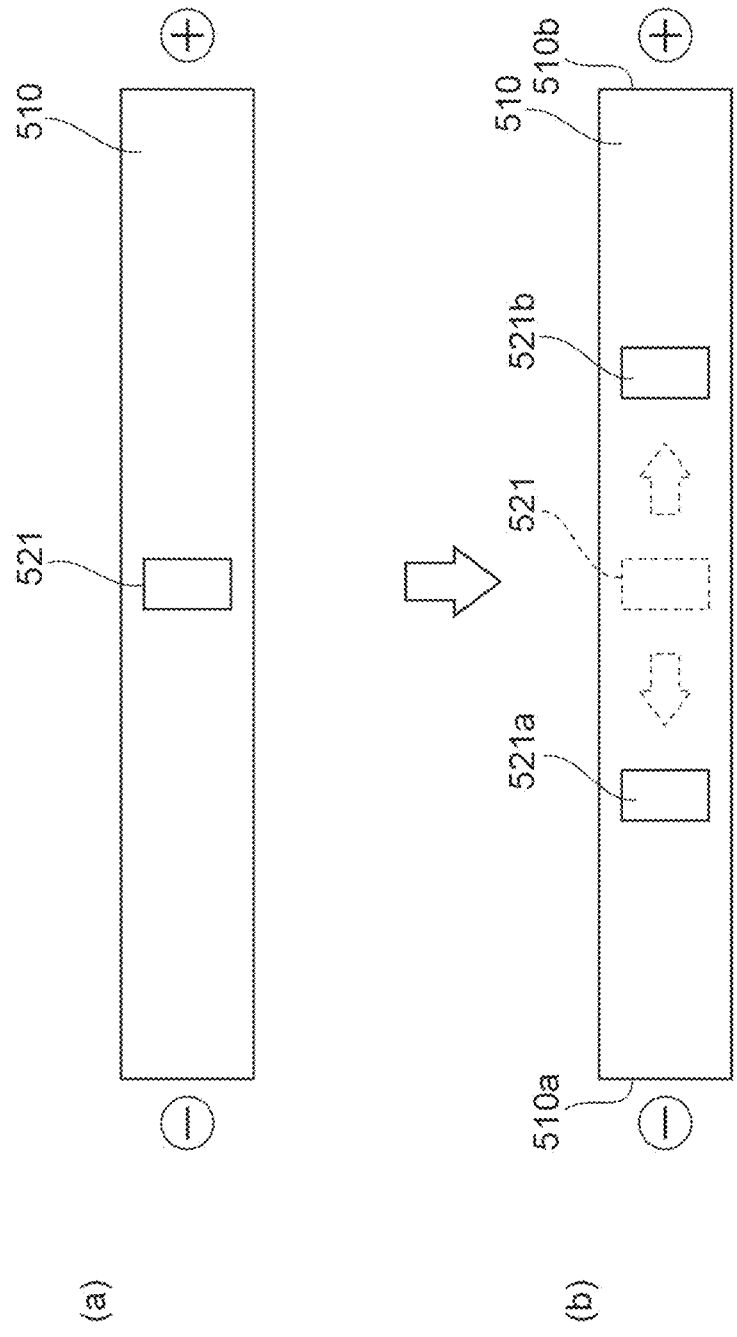
FIGS. 14(a) and 14(b) are views for describing electrophoresis according to a modification example.
Figure 15:
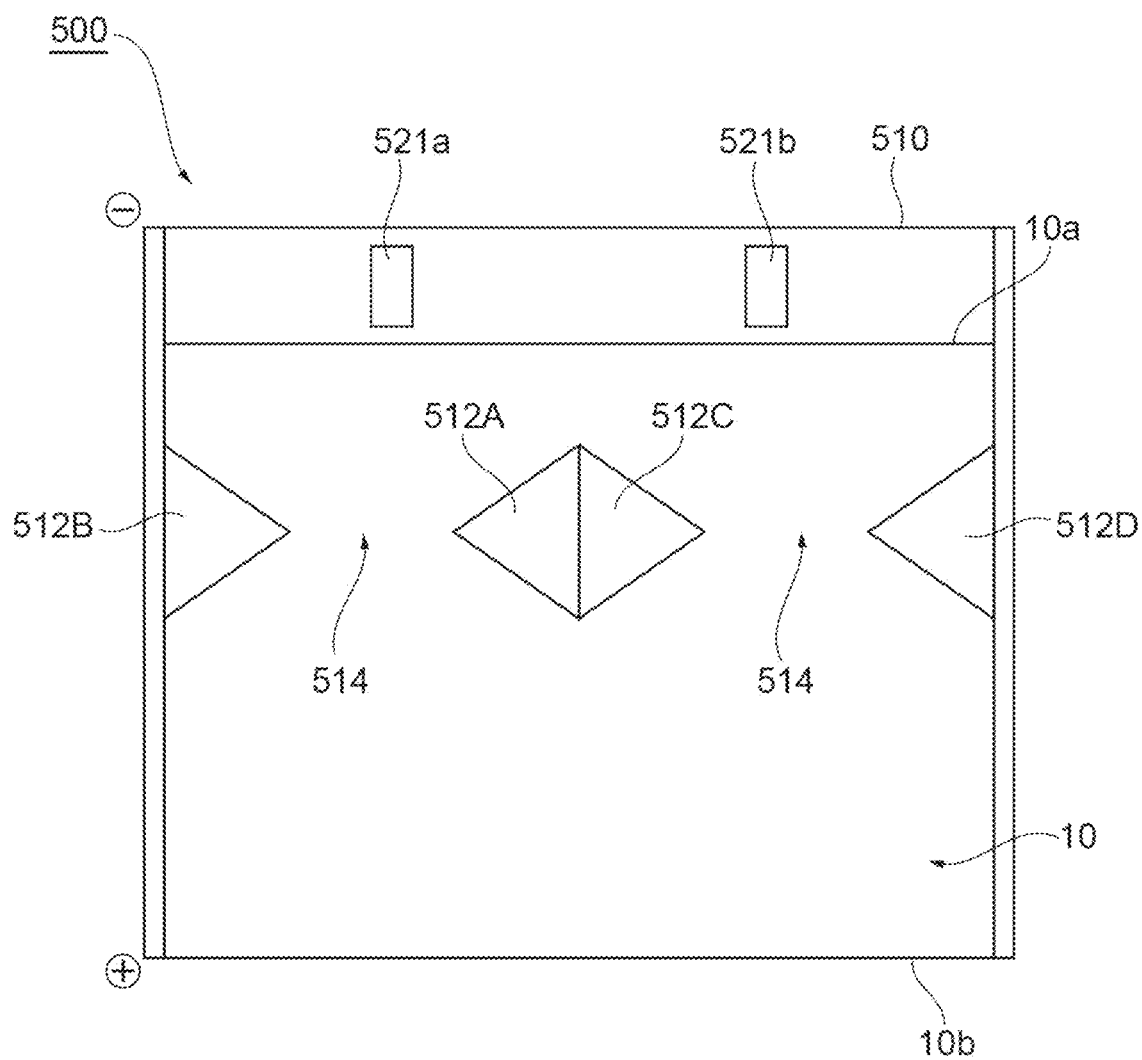
FIG. 15 is a view for describing electrophoresis according to a modification example.

In addition, as illustrated in FIGS. 14 and 15, isoelectric two-dimensional electrophoresis may be adopted. In this method, isoelectric electrophoresis is performed for the first time, and electrophoresis using the molecular sieving effect is performed for the second time in a direction perpendicular to the direction of electrophoresis performed for the first time. As illustrated in FIG. 14(a), a support body 510 having a pH gradient (for example, pH 3 to pH 10) is used in the isoelectric electrophoresis performed for the first time. Here, a sample 521 contains protein samples 521a and 521b having different states of charge. In this case, when the protein samples 521a and 521b move to positions where the charge is 0 (isoelectric point), the protein samples 521a and 521b are separated from each other. For example, as illustrated in FIG. 14(b), when the sample 521 is loaded at the center position of the support body 510 to be subjected to electrophoresis, the protein samples 521a and 521b move in different directions.

Next, a polyacrylamide gel support body (10% polyacrylamide gel+SDS) is used in the electrophoresis performed for the second time. Since the SDS is a chemical substance that unwinds the three-dimensional structure of a protein to bring the protein into a straight chain shape and makes the state of charge of the protein negative, the sample can be separated by molecular weight that is not dependent on the protein structure. As illustrated in FIG. 15, the support body 510 to be used for the first time is loaded in an accommodating container 500 so as to be in contact with the end portion 10a of the support body 10 formed of a polyacrylamide gel. In this state, voltage is applied to the support body 510, so that separation of the protein samples 521a and 521b is started. At this time, the protein samples 521a and 521b are subjected to electrophoresis at different positions. Namely, the support body 10 includes a flow path for the protein sample 521a and a flow path for the protein sample 521b which are parallel to each other. The support body 10 includes a concentrating portion 514 for each of the flow paths. Specifically, the concentrating portion 514 is formed for the protein sample 521a by insulator spacers 512A and 512B. In addition, the concentrating portion 514 is formed for the protein sample 521b by insulator spacers 512C and 512D. In such a manner, one support body may include the concentrating portions at a plurality of locations.

Furthermore, as described in FIG. 14, objects in a sample may move in different directions. In such a case, a concentrating portion may be provided for an object moving in one direction, and a concentrating portion may be provided for an object moving in an opposite direction. For example, the support body 510 illustrated in FIG. 14(b) may include the concentrating portion for the protein sample 521a on an end portion 510a side, and the concentrating portion for the protein sample 521b on an end portion 510b side. In this case, regarding the concentrating portion for the protein sample 521a, an end portion 510b corresponds to a "first end portion" in the claims, and an end portion 510a corresponds to a "second end portion" in the claims. Meanwhile, regarding the concentrating portion for the protein sample 521b, the end portion 510a corresponds to the "first end portion" in the claims, and the end portion 510b corresponds to the "second end portion" in the claims.

REFERENCE SIGNS LIST

1: electrophoresis system, 2, 30, 40, 60, 70, 80, 90, 100, 110, 120, 200, 300, 350, 402, 500: accommodating container, 10: support body, 10*a*: end portion (first end portion), 10*b*: end portion (second end portion), 12A, 12B, 32A, 32B, 42, 43, 62A, 62B, 72A, 72B, 82A, 82B, 92A, 92B, 102A, 102B, 103A, 103B, 212, 512A, 512B, 512C, 512D: insulator spacer (insulator), 12*a*: inclined surface (first portion), 12*c*: top (concentrating portion forming portion), 14, 514: concentrating portion, 16*a*: inner surface (first portion and second portion), 20: sample, 21: object, 25A, 25B: defining surface, 25*a*: end portion (first end portion), 25*b*: end portion (second end portion), E1: region (first region), E2: region (first region and second region), E3: region (second region).

The invention claimed is:

1. An electrophoresis method for causing a sample containing a biological substance to move inside a support body to separate the sample and the biological substance from each other, the method comprising:
    a support body preparation step of providing the support body that includes a first end portion on a first end portion side and a second end portion on a second end portion side that is on the other side of the support body, and forms a flow path of the sample in a first direction between the first end portion and the second end portion;
    a sample loading step of loading the sample with respect to the support body; and
    a voltage application step of applying voltage to perform electrophoresis by forming a potential difference in the flow path and thus to cause the biological substance to move in the flow path in the first direction towards the second end portion side,
    wherein the support body includes a concentrating portion, which concentrates the biological substance, between the first end portion and the second end portion, and
    when an area of a cut section of the flow path when cut at a predetermined position in the first direction along a plane orthogonal to the first direction is a flow path cross-sectional area, a flow path cross-sectional area of the concentrating portion is smaller than a flow path cross-sectional area in a first region closer to the first end portion side than the concentrating portion, and a flow path cross-sectional area of a second region closer to the second end portion side than the concentrating portion is larger than the flow path cross-sectional area of the concentrating portion,
    wherein a defining surface that defines the flow path cross-sectional area has:
        a first portion,
        a concentrating portion forming portion which forms the concentrating portion that concentrates the biological substance between the first end portion and the second end portion, and
        a second portion closer to the second end portion side than the concentrating portion forming portion, wherein:
            (a) the second portion of the defining surface has a second surface that, starting from the concentrating portion forming portion, extends in a second direction orthogonal to the first direction in a manner that widens the flow path cross-sectional area through which the biological substance passes during the electrophoresis, and when viewed from a third direction orthogonal to the first and second directions, the first portion of the defining surface has a first surface that, starting from the concentrating portion forming portion, extends in a straight line towards the first end portion side in or parallel to the first direction, or
            (b) the second portion of the defining surface has the second surface that, starting from the concentrating portion forming portion, extends in a fourth direction that forms an angle of larger than 90° with respect to the first direction and extends towards the first end portion side that widens the flow path cross-sectional area through which the biological substance passes during the electrophoresis;
    wherein the concentrating portion forming portion is spaced apart from the first end portion and the second end portion in the first direction, and
    wherein the concentrating portion forming portion defines a top, and the first portion of the defining surface and the second portion of the defining surface are connected at the top in a bent state.

2. The electrophoresis method according to claim 1, wherein an insulator defines the flow path cross-sectional area to form the concentrating portion.

3. The electrophoresis method according to claim 1, wherein the flow path is widened in a boundary portion between the concentrating portion and the second region in a direction intersecting the first direction.

4. The electrophoresis method according to claim 1, wherein the flow path cross-sectional area of the first region is decreased as the first region approaches the concentrating portion from the first end portion side.

5. The electrophoresis method according to claim 1, wherein in the sample loading step, the sample is loaded in a sample loading portion that extends to the second end portion side as the sample loading portion extends away from a center position in the second direction orthogonal to the first direction.

6. An electrophoresis system that causes a sample containing a biological substance to move inside a support body to separate the sample and the biological substance from each other, the system comprising:
    the support body that includes a first end portion on a first end portion side and a second end portion on a second end portion side that is on the other side of the support body, and forms a flow path of the sample in a first direction between the first end portion and the second end portion; and
    a voltage application unit configured to apply a voltage to perform electrophoresis by forming a potential difference in the flow path and thus to cause the biological substance of the sample, which is loaded on the first end portion side, to move in the flow path in the first direction towards the second end portion side,
    wherein the support body includes a concentrating portion, which concentrates the biological substance, between the first end portion and the second end portion, and
    when an area of a cut section of the flow path when cut at a predetermined position in the first direction along a plane orthogonal to the first direction is a flow path cross-sectional area, a flow path cross-sectional area of the concentrating portion is smaller than a flow path cross-sectional area in a first region closer to the first end portion side than the concentrating portion, and a flow path cross-sectional area of a second region closer to the second end portion side than the concentrating portion is larger than the flow path cross-sectional area of the concentrating portion, a defining surface that defines the flow path cross-sectional area has:
a first portion,
a concentrating portion forming portion which forms the concentrating portion that concentrates the biological substance between the first end portion and the second end portion, and
a second portion closer to the second end portion side than the concentrating portion forming portion, wherein:
(a) the second portion of the defining surface has a second surface that, starting from the concentrating portion forming portion, extends in a second direction orthogonal to the first direction in a manner that widens the flow path cross-sectional area through which the biological substance passes during the electrophoresis, and when viewed from a third direction orthogonal to the first and second directions, the first portion of the defining surface has a first surface that, starting from the concentrating portion forming portion, extends in a straight line towards the first end portion side in or parallel to the first direction, or
(b) the second portion of the defining surface has the second surface that, starting from the concentrating portion forming portion, extends in a fourth direction that forms an angle of larger than 90° with respect to the first direction and extends towards the first end portion side that widens the flow path cross-sectional area through which the biological substance passes during the electrophoresis;
wherein the concentrating portion forming portion is spaced apart from the first end portion and the second end portion in the first direction, and
wherein the concentrating portion forming portion defines a top, and the first portion of the defining surface and the second portion of the defining surface are connected at the top in a bent state.

7. The electrophoresis system according to claim 6, wherein an insulator defines the flow path cross-sectional area to form the concentrating portion.

8. The electrophoresis system according to claim 6, wherein the flow path is widened in a boundary portion between the concentrating portion and the second region in a direction intersecting the first direction.

9. The electrophoresis system according to claim 6, wherein the flow path cross-sectional area of the first region is decreased as the first region approaches the concentrating portion from the first end portion side.

10. The electrophoresis system according to claim 6, wherein the support body includes a sample loading portion in which the sample is loaded, and
the sample loading portion extends to the second end portion side as the sample loading portion extends away from a center position in the second direction orthogonal to the first direction.

11. An accommodating container for electrophoresis that accommodates a support body for causing a sample containing a biological substance to move inside the support body to separate the sample and the biological substance from each other, the container comprising:
a defining surface that defines a flow path cross-sectional area of a flow path of the sample, the flow path extending in a first direction inside the support body,
wherein the flow path cross-sectional area is an area of a cut section of the flow path when cut at a predetermined position in the first direction along a plane orthogonal to the first direction,
the defining surface extends along the first direction, has a first end portion on a first end portion side and a second end portion on a second end portion side that is on the other side of the support body, and the defining surface has:
a first portion,
a concentrating portion forming portion, which forms a concentrating portion that concentrates the biological substance, between the first end portion and the second end portion, and
a second portion closer to the second end portion side than the concentrating portion forming portion,
a flow path cross-sectional area defined by the concentrating portion forming portion is smaller than a flow path cross-sectional area defined by the first portion closer to the first end portion side than the concentrating portion forming portion, and
a flow path cross-sectional area defined by the second portion is larger than the flow path cross-sectional area defined by the concentrating portion forming portion,
wherein:
(a) the second portion of the defining surface has a second surface that, starting from the concentrating portion forming portion, extends in a second direction orthogonal to the first direction in a manner that widens the flow path cross-sectional area through which the biological substance passes during electrophoresis, and when viewed from a third direction orthogonal to the first and second directions, the first portion of the defining surface has a first surface that, starting from the concentrating portion forming portion, extends in a straight line towards the first end portion side in or parallel to the first direction, or
(b) the second portion of the defining surface has the second surface that, starting from the concentrating portion forming portion, extends in a fourth direction that forms an angle of larger than 90° with respect to the first direction and extends towards the first end portion side that widens the flow path cross-sectional area through which the biological substance passes during the electrophoresis;
wherein the concentrating portion forming portion is spaced apart from the first end portion and the second end portion in the first direction, and
wherein the concentrating portion forming portion defines a top, and the first portion of the defining surface and the second portion of the defining surface are connected at the top in a bent state.

12. The accommodating container for electrophoresis according to claim 11,
wherein the concentrating portion forming portion is formed by an insulator.

13. The accommodating container for electrophoresis according to claim 11,
wherein the defining surface is widened in a boundary portion between the concentrating portion forming portion and the second portion in a direction intersecting the first direction.

14. The accommodating container for electrophoresis according to claim 11, wherein the flow path cross-sectional area defined by the first portion is decreased as the first portion approaches the concentrating portion forming portion from the first end portion side.

* * * * *